United States Patent
Douglas et al.

(10) Patent No.: US 8,227,002 B2
(45) Date of Patent: Jul. 24, 2012

(54) DOMESTIC APPLIANCE

(75) Inventors: Paul Graham Douglas, Malmesbury (GB); Kevin Paul Byrne, Malmesbury (GB); Adrian Anthony Parsons, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 233 days.

(21) Appl. No.: 12/487,152

(22) Filed: Jun. 18, 2009

(65) Prior Publication Data

US 2010/0151103 A1   Jun. 17, 2010

(30) Foreign Application Priority Data

Jun. 20, 2008   (GB) .................................. 0811328.4

(51) Int. Cl.
  *H05B 1/02* (2006.01)
  *F27D 11/00* (2006.01)
  *A23J 1/00* (2006.01)
  *A23B 4/03* (2006.01)
  *A47J 37/08* (2006.01)

(52) U.S. Cl. ........ 426/233; 426/466; 426/520; 426/231; 219/502; 219/412; 219/506; 219/497; 99/385

(58) Field of Classification Search .................. 426/233; 99/385; 219/512
See application file for complete search history.

(56) References Cited

U.S. PATENT DOCUMENTS

| | | | |
|---|---|---|---|
| 2,631,523 A | 3/1953 | Olving | |
| 4,245,148 A * | 1/1981 | Gisske et al. | 219/492 |
| 4,363,957 A * | 12/1982 | Tachikawa et al. | 219/497 |
| 4,426,572 A | 1/1984 | Tachikawa et al. | |
| 4,433,232 A | 2/1984 | Tachikawa et al. | |
| 5,126,536 A * | 6/1992 | Devlin | 219/497 |
| 5,170,024 A | 12/1992 | Hanatani et al. | |
| 5,672,288 A * | 9/1997 | Tran | 219/502 |
| 5,938,962 A * | 8/1999 | Adamski et al. | 219/502 |
| 5,958,271 A | 9/1999 | Westerberg et al. | |
| 6,006,656 A | 12/1999 | Lulofs et al. | |
| 6,011,242 A | 1/2000 | Westerberg | |

(Continued)

FOREIGN PATENT DOCUMENTS

GB   2199733   7/1988

(Continued)

OTHER PUBLICATIONS

GB Search Report, dated Oct. 21, 2008, directed to corresponding GB Application GB0811328.4; (1 page).

(Continued)

*Primary Examiner* — D. Lawrence Tarazano
*Assistant Examiner* — Assaf Zilbering
(74) *Attorney, Agent, or Firm* — Morrison & Foerster LLP

(57) ABSTRACT

A toasting appliance includes a toasting chamber, a heating element arranged to heat a foodstuff located within the toasting chamber, and an optical system for optically illuminating the foodstuff and detecting light reflected from the foodstuff. Before the foodstuff begins to change color as a result due to the heating thereof by the heating element, a controller varies the illumination of the foodstuff by the optical system so that the intensity of the light reflected from the foodstuff is at or around a set value. The controller subsequently terminates the toasting operation when the intensity of the light reflected from the foodstuff has reduced, due to toasting thereof, from the set value by an amount depending on a desired degree of toasting of the foodstuff.

15 Claims, 15 Drawing Sheets

U.S. PATENT DOCUMENTS

| | | |
|---|---|---|
| 6,730,888 B1 | 5/2004 | Battu |
| 2004/0206248 A1* | 10/2004 | Lawson ............................ 99/388 |
| 2005/0132900 A1 | 6/2005 | Cavada et al. |
| 2005/0173400 A1 | 8/2005 | Cavada et al. |
| 2010/0154653 A1 | 6/2010 | Douglas et al. |

FOREIGN PATENT DOCUMENTS

| | | |
|---|---|---|
| WO | WO-89/01279 | 2/1989 |
| WO | WO-03/011090 | 2/2003 |
| WO | WO-02/060302 | 8/2008 |

OTHER PUBLICATIONS

Douglas et al., U.S. Office Action mailed Apr. 27, 2011, directed to U.S. Appl. No. 12/486,516; 8 pages.

Douglas et al., U.S. Office Action mailed Oct. 14, 2011, directed to U.S. Appl. No. 12/486,516; 8 pages.

* cited by examiner

DOMESTIC APPLIANCE

REFERENCE TO RELATED APPLICATION

This application claims the priority of United Kingdom Application No. 0811328.4, filed Jun. 20, 2008, the contents of which are incorporated herein by reference.

FIELD OF THE INVENTION

This invention relates to a toasting appliance, such as a domestic electric toaster.

BACKGROUND OF THE INVENTION

A domestic electric toaster typically comprises a toasting chamber into which slices of bread or other toastable foodstuffs are introduced, a source of radiant heat in the form of a plurality of electric heating elements and a cabinet housing these components. A carriage is provided in order to assist the user in inserting and removing the bread. Conventionally, domestic toasters have slots in their upper surface into which bread may be inserted. The carriage is then lowered vertically, the heating elements are energised and the bread is toasted. At the end of the toasting operation, the carriage is raised so that the toast protrudes upwardly from the slots for removal by the user.

The duration of the activation of the heating elements controls the degree of browning of the toast. Domestic toasters usually include a manually adjustable dial to enable the user to select the degree of browning, in response to which the toaster controls the duration of the activation of the heating elements. In many domestic electric toasters, the activation of the heating elements is controlled solely on a time basis, with the duration of the toasting operation decreasing with the required degree of browning. However, any one setting of the dial can produce different degrees of browning depending, inter alia, on the nature of the foodstuff, its moisture content and the ambient temperature at the start of the toasting operation, and so alternative techniques for controlling the duration of the activation of the heating elements have been explored.

One such technique is described in GB 2,199,733, in which the foodstuff to be toasted is illuminated using a light source. A light detector is located alongside the light source to produce a signal whose magnitude is proportional to the amount of reflected light received by the detector. A circuit is provided to terminate the toasting operation when the signal output from the detector indicates that the amount of reflected light has fallen to a selected percentage of its initial value, with the selected percentage being chosen depending on the required degree of browning, for example 50% for lightly toasted bread, and 20% for very well done bread. While the initial value of the reflected signal would be different for white and brown bread, the relationship between the degree of browning and the percentage reduction in the signal from the detector was found to be substantially the same for both bread types. However, for accurate browning control a look-up table or other means for correlating the required reduction in the amount of reflected light with the desired degree of browning will need to be stored for each possible initial value for the amount of reflected light.

SUMMARY OF THE INVENTION

It is an aim of at least the preferred embodiment of the present invention to provide a toasting appliance in which the detection of the degree of browning of the toasted foodstuff is improved further.

In a first aspect, the present invention provides a toasting appliance comprising a toasting chamber, a heating element for heating a foodstuff located within the toasting chamber, an optical system for illuminating optically the foodstuff and for detecting light reflected from the foodstuff, and a controller for varying the illumination of the foodstuff by the optical system before the foodstuff begins to change colour due to heating thereof so that the intensity of the light reflected from the foodstuff is at or around a set value, and for terminating the toasting operation when the intensity of the light reflected from the foodstuff has reduced from the set value to a value depending on a desired degree of toasting of the foodstuff.

The toasting appliance preferably comprises a user interface comprising one or more buttons, a dial or a touch-sensitive screen through which the user inputs the required degree of browning of the foodstuff. Before the foodstuff begins to change colour as a result of heat emitted from the heating element, preferably within fifty seconds from the start of the toasting operation and more preferably within thirty seconds from the start of the toasting operation, the controller varies the illumination of the foodstuff by the optical system so that the intensity of the light reflected from the foodstuff is at or around a set value. Once this intensity has been reached, the illumination of the foodstuff by the optical system is preferably maintained at a relatively constant level for the remainder of the toasting operation. Depending on the output from the user interface which is indicative of the required degree of browning, the controller sets an appropriate reduced value for the intensity of the reflected light, and terminates the toasting operation when this reduced value has been reached due to toasting of the foodstuff. The controller may be arranged to store for each degree of toasting selectable by a user a respective value for the intensity of light reflected from the foodstuff at which the toasting operation is to be terminated. Alternatively, this value may be calculated by the controller depending on the required degree of toasting.

For safety purposes, the controller is preferably arranged to terminate the toasting operation in the event that the intensity of the light reflected from the foodstuff has not reduced to this reduced value before the expiry of a set period of time.

When the foodstuff to be toasted is very dark, the intensity of the light reflected from the foodstuff may remain below the set value, even when the intensity of the illumination of the foodstuff by the optical system is at a maximum value. In this event, the controller is preferably arranged to terminate the toasting operation on a time basis in the event that the optical system is unable to raise the intensity of the light reflected from the foodstuff to the set value. The controller may be arranged to vary the duration of the toasting operation depending on the desired degree of toasting of the foodstuff.

The optical system preferably comprises a light source, and an optical receiver for receiving light reflected from the foodstuff. The light source is preferably a monochromatic light source, such as an LED, and preferably emits light having a wavelength in the range from 400 to 700 nm, more preferably in the range from 450 to 600 nm. In a preferred embodiment, the light source is a green LED. The light source is preferably arranged to emit strobed light to reduce interference effects from ambient illumination sources, such as fluorescent lighting, on the browning detection. The optical receiver is preferably a photodiode, a phototransistor or a light dependent resistor for receiving strobed light reflected from the foodstuff.

The heating element preferably comprises a former on to which a heater wire is wound. The former is preferably formed from mica, and the heater wire is preferably formed from nichrome. When energised by a mains power supply, the heater wire starts to glow red after a short period of time, for example between 10 and 30 seconds depending on the voltage of the power supply. To compensate for the resulting change in the illumination of the toasting chamber as the heater wire heats up, the optical system may further comprise a second light source for illuminating optically at least the optical receiver with light having a wavelength different from the first-mentioned light source and preferably in the range from 550 to 750 nm. This second light source may be conveniently provided by a red or orange LED, or other light source which emits light having a similar wavelength as the light emitted from the glowing heater wire. This second light source may be conveniently located adjacent the optical receiver.

The intensity of the light emitted from the second light source is varied during the toasting operation. During a first period of the toasting operation, in which the heater wire does not glow, the intensity of the light emitted from the second light source is relatively high. As the heater wire begins to glow, the intensity of the light emitted from the second light source is reduced gradually or stepwise to a lower value. The illumination of the optical receiver by a combination of light which has (i) been emitted from the heating element and reflected by the foodstuff towards the optical receiver and (ii) been emitted the second light source, can be thus maintained at a relatively constant value during the toasting operation.

The first-mentioned light source may be located within a first light guide for conveying light to the toasting chamber, and the optical receiver and the second light source may be located within a second light guide for conveying light from the toasting chamber. The use of light guides, such as light pipes, for conveying light to and/or from the toasting chamber can enable the more temperature-sensitive components of the optical system to be spaced from the hot toasting chamber, which may reach temperatures in excess of 700° C. during a toasting operation.

The light guides may be connected either directly or indirectly to the heating element or otherwise mounted within the appliance. For example, the light guides may be connected to a bracket or other member for holding the heating element. The light guides may extend through an aperture formed in the heating element, and may comprise one or more angled reflective surface for changing the direction of the light passing therethrough. These light sources and the optical receiver are preferably located beneath the heating element and thus towards the relatively cool base of the toasting appliance. These components may be connected to a printed circuit board located on the base of the toasting appliance so as to be shielded from the hot toasting chamber.

At least part of the optical system is preferably moveable relative to a carriage for holding the foodstuff within the toasting chamber. Moving at least part of the optical system relative to the carriage, and thus towards and away from a foodstuff located within the toasting chamber, can enable the intensity of the illumination of the foodstuff to be substantially constant irrespective of the thickness of the foodstuff, and can enable the optical system to be located in close proximity to the foodstuff, increasing the sensitivity of the optical system to changes in the colour of the foodstuff during toasting.

The heating element is preferably moveable towards and away from the carriage. Moving the heating element towards the carriage can ensure that the heating element is in close proximity to the foodstuff to be toasted during a toasting operation irrespective of the thickness of the foodstuff, enabling the required degree of browning to be achieved rapidly. Said at least part of the optical system may be conveniently mounted for movement with the heating element. Alternatively, separate mechanisms may be provided for moving the heating element and said at least part of the optical system. As another alternative, the heating element may be stationary, and a mechanism may be provided for moving said at least part of the optical system relative to the carriage by an amount depending on the thickness of the foodstuff located therein.

The term "toasting appliance" is intended to cover a broad range of appliances which are arranged to warm up, toast or crisp bread products, pastries and the like, and includes both domestic and commercial toasters, toaster ovens and toasting compartments forming part of a larger appliance, such as microwave ovens with an integral toaster.

In a second aspect, the present invention provides a method of toasting a foodstuff, comprising the steps of locating the foodstuff within a toasting chamber, illuminating optically the foodstuff and detecting light reflected from the foodstuff, activating a heating element to commence a toasting operation, before the foodstuff begins to change colour due to heating thereof, varying the illumination of the foodstuff so that the intensity of the light reflected from the foodstuff is at or around a set value, and subsequently terminating the toasting operation when the intensity of the light reflected from the foodstuff has reduced from the set value to a value depending on a desired degree of toasting of the foodstuff.

As mentioned above, the toasting operation may be terminated on a time basis in the event that the intensity of the light reflected from the foodstuff can not be raised to the set value. In this event, the duration of the toasting operation may be varied depending on the desired degree of toasting of the foodstuff.

Features described above in relation to the first aspect of the invention are equally applicable to the second aspect, and vice versa.

BRIEF DESCRIPTION OF THE DRAWINGS

The invention will now be described, by way of example, with reference to the accompanying drawings in which.

DETAILED DESCRIPTION OF THE INVENTION

Figure 1:
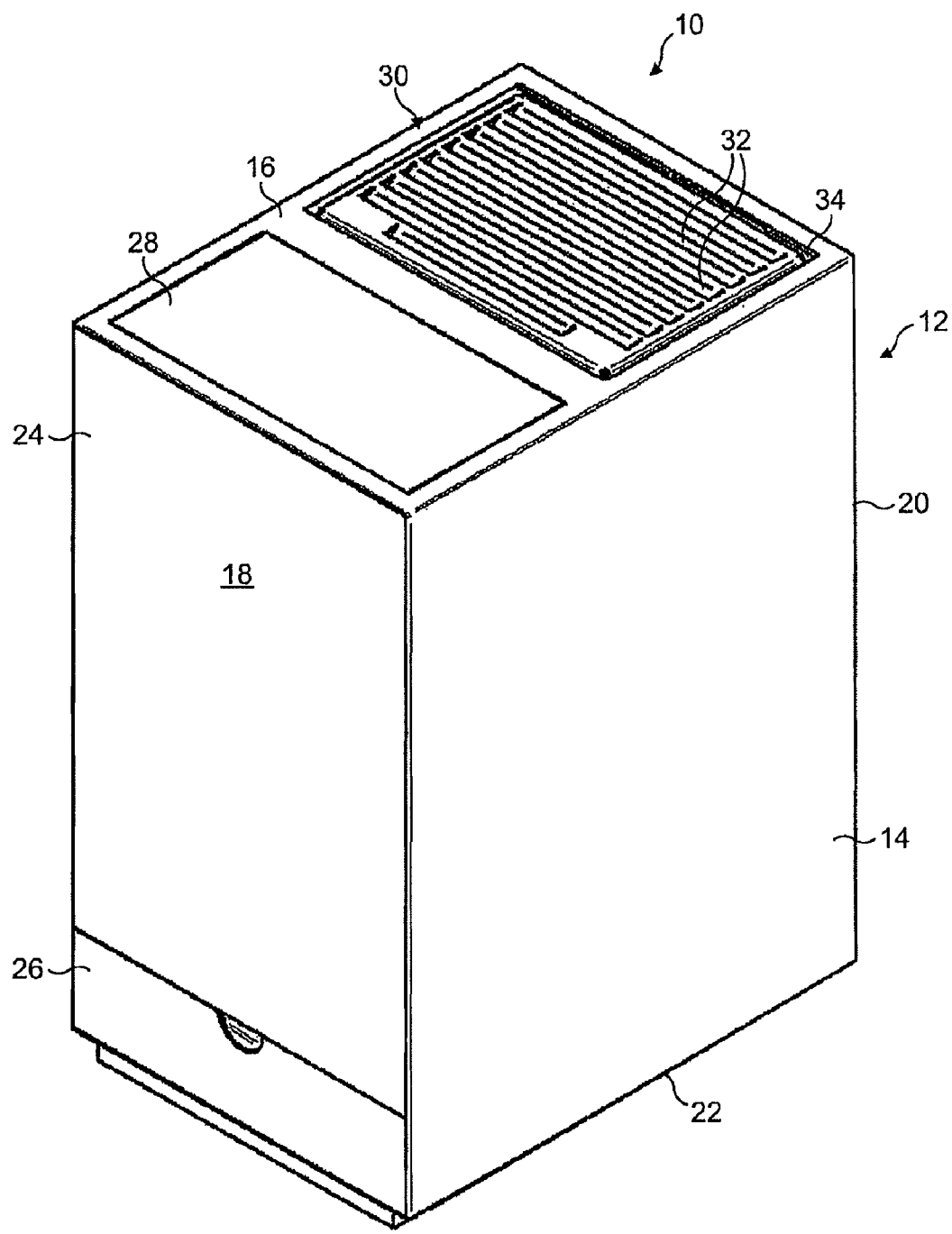
FIG. 1 is a perspective view of a toasting appliance constructed according to the invention with its door in a closed position.
Figure 2:
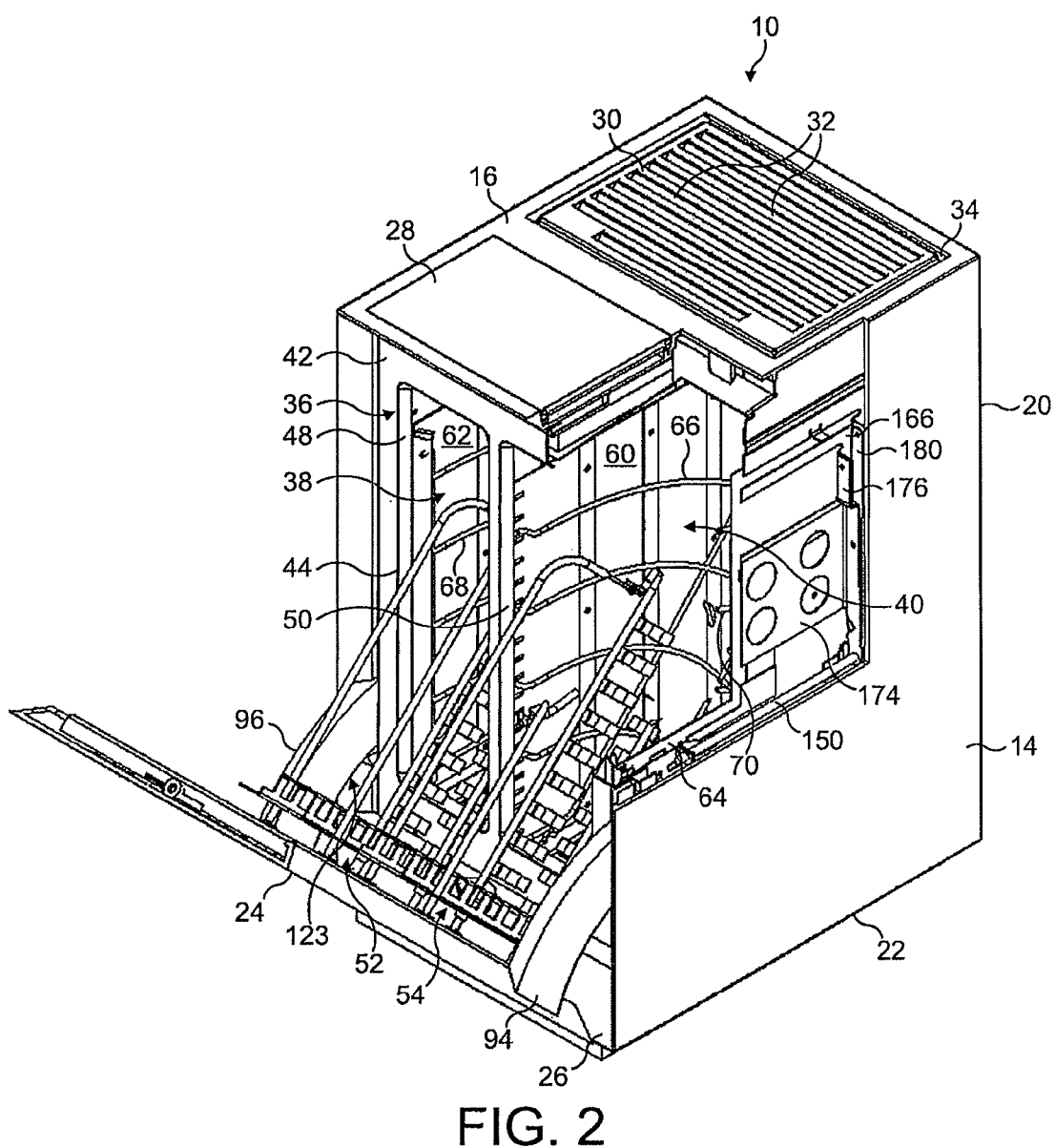
FIG. 2 is a partly cut-away perspective view of the appliance of FIG. 1 with its door in an open position.
Figure 3:
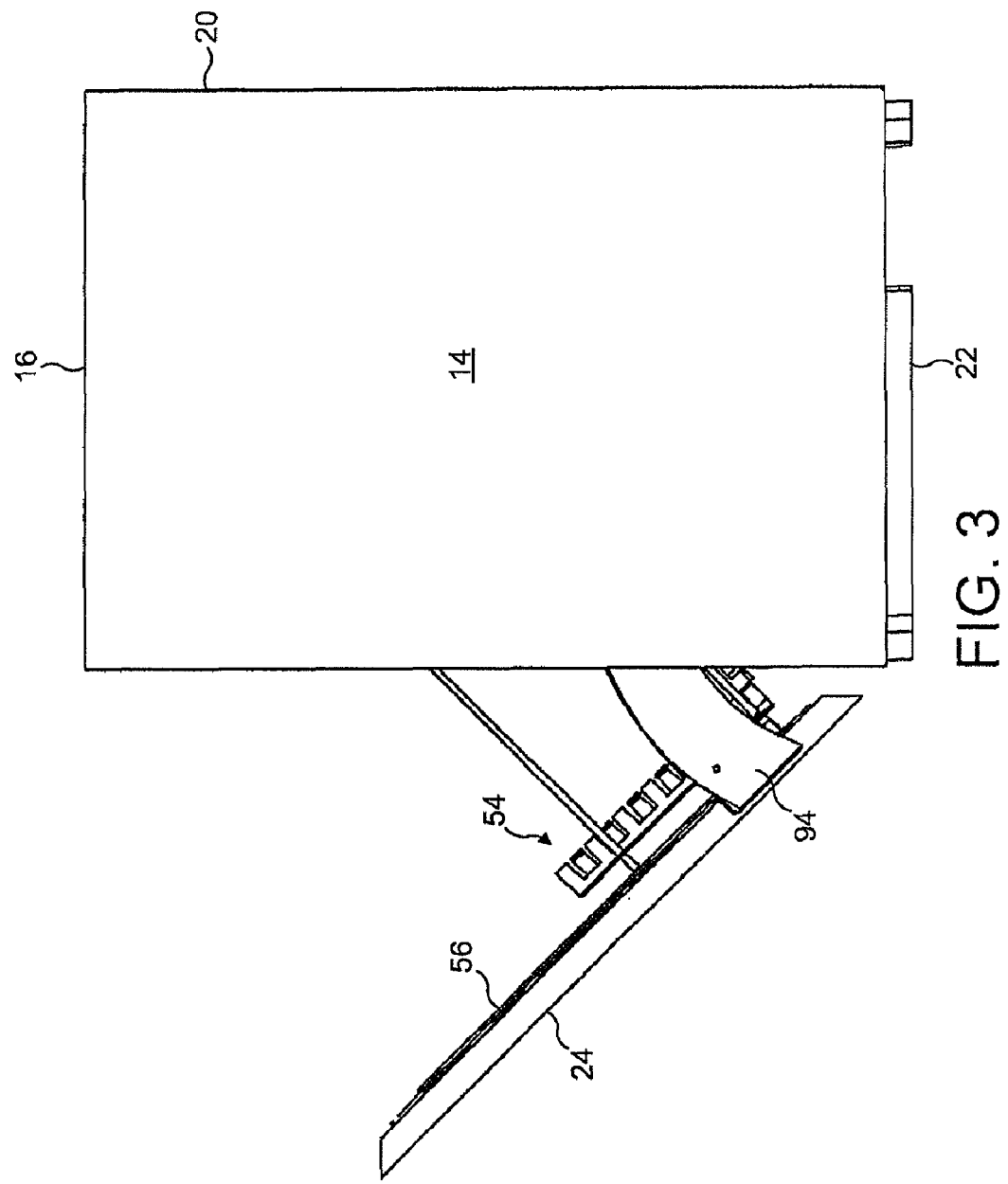
FIG. 3 is a side view of the appliance with its door in an open position.

With reference to FIGS. 1 to 3, a toasting appliance is shown in the form of a domestic electric toaster 10. The toaster 10 comprises an outer cabinet 12 having two side surfaces 14 and, extending between the side surfaces 14, an upper surface 16, a front surface 18, a rear surface 20 and a base 22. In this example, each of the side, front, and rear surfaces 14, 18, 20 is substantially flat, with the cabinet 12 being generally in the shape of cuboid, or right parallelepiped. Although the edges between adjoining surfaces of the cabinet 12 may be chamfered, it is preferred that the radius of each chamfer is less than 1 mm, preferably around 0.75 mm.

A substantial part of the front surface 18 comprises a door 24. The door 24 is arranged to pivot downwardly and away from the upper surface 16 of the cabinet 12 when moving from a closed position, as shown in FIG. 1, to an open position, as shown in FIGS. 2 and 3. The front surface 18 of the cabinet 12 further comprises the front face 26 of a drawer for catching crumbs which have fallen from a foodstuff located within the cabinet 12. Guides may be provided to guide these crumbs into the drawer. The front face 26 of the drawer is profiled to enable a user to pull the front face 26 of the drawer away from the cabinet 12 in order to remove the drawer from the toaster 10 for emptying of the crumbs and cleaning. When the user has cleaned the drawer, the cleaned drawer can be pushed back into the cabinet 12 with the front face 26 substantially flush with the door 24 when in its closed position.

The upper surface 16 comprises a user interface in the form of a control panel 28, incorporating user-selectable controls. The control panel 28 is conveniently located on the portion of the upper surface 16 near to the front surface 18. The control panel may comprise buttons in the form of capacitive sensors to permit the user to control various operations of the toaster 10. For example, the buttons may be utilised to start and stop the toasting operation, to select a type of product to be toasted, to open and close the door 24 and to control the degree of browning of the foodstuff during the toasting process. Alternatively, or additionally, the control panel 28 may comprise a touch-sensitive screen, dial or other user operable items for controlling operation of the toaster 10.

The upper surface 16 further comprises an air outlet region 30. In this example, the air outlet region 30 includes a plurality of inner apertures 32 surrounded by an outer aperture 34. The purpose and function of the air outlet region 30 is described in more detail later in the specification.

FIGS. 2 and 3 illustrate the toaster 10 with the door 24 in an open position. In the partly cut away drawing of FIG. 2, some of the internal features of the toaster 10 are revealed. The interior of the toaster 10 comprises a toasting chamber 36. In this embodiment, the toasting chamber 36 is divided centrally into two sub-chambers 38, 40, also illustrated in FIG. 4. Each sub-chamber 38, 40 is dimensioned to receive a slice of bread or other toastable foodstuff, such as a bagel, crumpet or the like. A front plate 42 located in front of the toasting chamber 36 is shaped to define two slot-like openings 44, 46 through which foodstuffs enter the sub-chambers 38, 40. At least the opposing long edges 48, 50 of each openings 44, 46 are bevelled towards the interior of the toasting chamber 36 to guide the foodstuffs into the sub-chambers 38, 40. The angle subtended between front plate 42 and the edges 48, 50 of the openings 44, 46 is preferably in the range from 30 to 60°, and in this example is around 45°.

Two carriages 52, 54 are attached to a panel 56 connected to the inner surface of the door 24. Each carriage 52, 54 is arranged to support the foodstuff to be toasted. As the door 24 is moved from the open position to the closed position, the carriages 52, 54 transport the foodstuffs through the openings 44, 46 and into the toasting chamber 36 for cooking.

Figure 4:
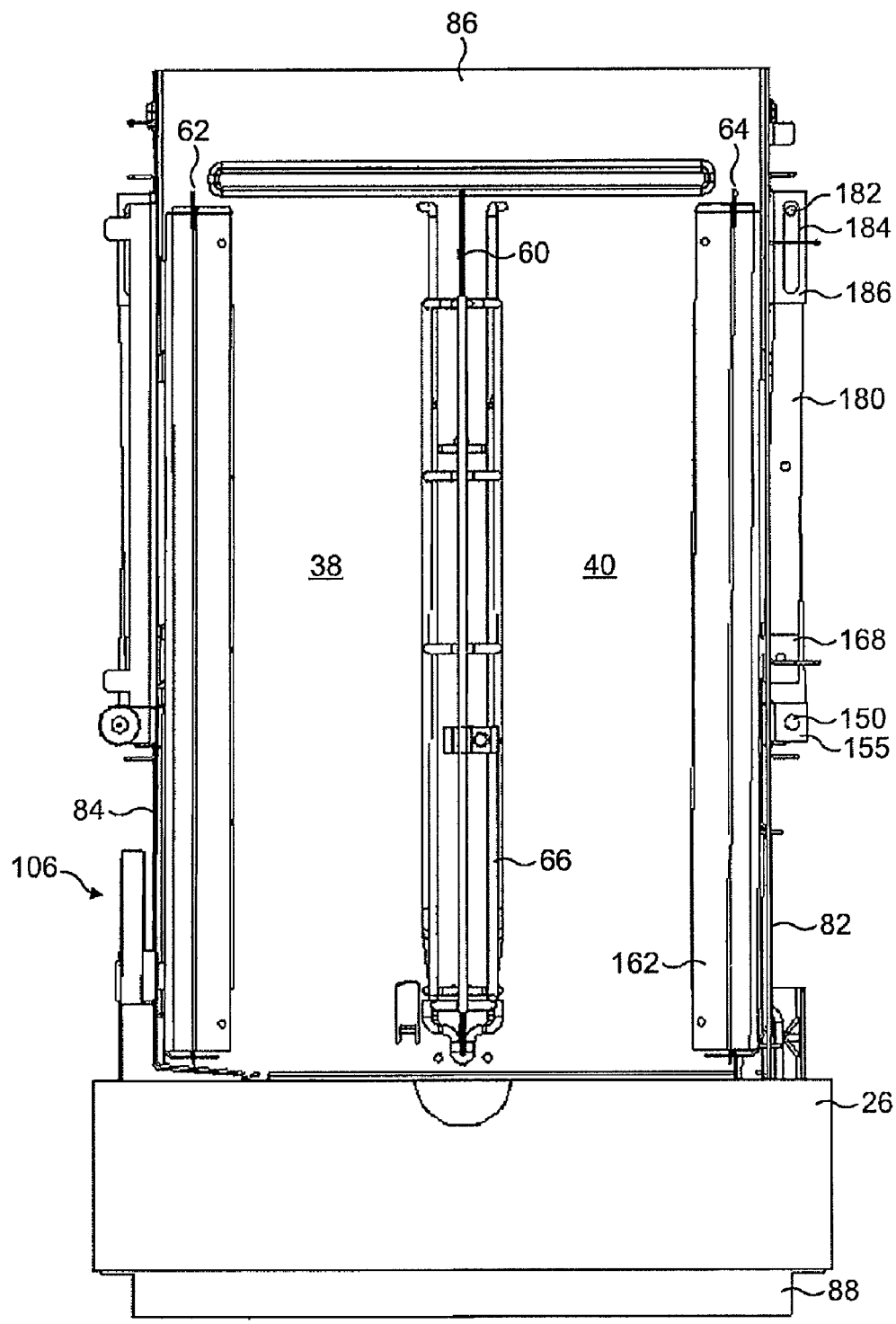
FIG. 4 is a front view of an inner cabinet of appliance, illustrating a position of the heating elements when the door is in an open position.

Cooking of the foodstuffs is effected by means of heating elements. With reference to FIG. 4, the toasting chamber 36 is heated by a stationary heating element 60 and two moveable heating elements 62, 64 located on opposite sides of the stationary heating element 60 and moveable relative thereto. The stationary heating element 60 is located centrally within the toasting chamber 36, and serves to divide the toasting chamber 36 into the two sub-chambers 38, 40. The stationary heating element 60 comprises wires, preferably formed from nichrome, wound on to a former formed from insulating sheet material, preferably mica, so that one side of the stationary heating element 60 heats the left (as viewed in FIG. 4) sub-chamber 38 and the other side of the stationary heating element 60 heats the right (as viewed in FIG. 4) sub-chamber 40. A protective grille 66 is located about the stationary heating element 60 to prevent direct contact between the stationary heating element 60 and the foodstuffs. The moveable heating elements 62, 64 each also comprise wire wound around a mica former, and a protective grille 68, 70 is located to the side of each moveable heating element 62, 64 which faces the stationary heating element 60 to prevent direct contact between the moveable heating elements 62, 64 and the foodstuffs.

Figure 5:
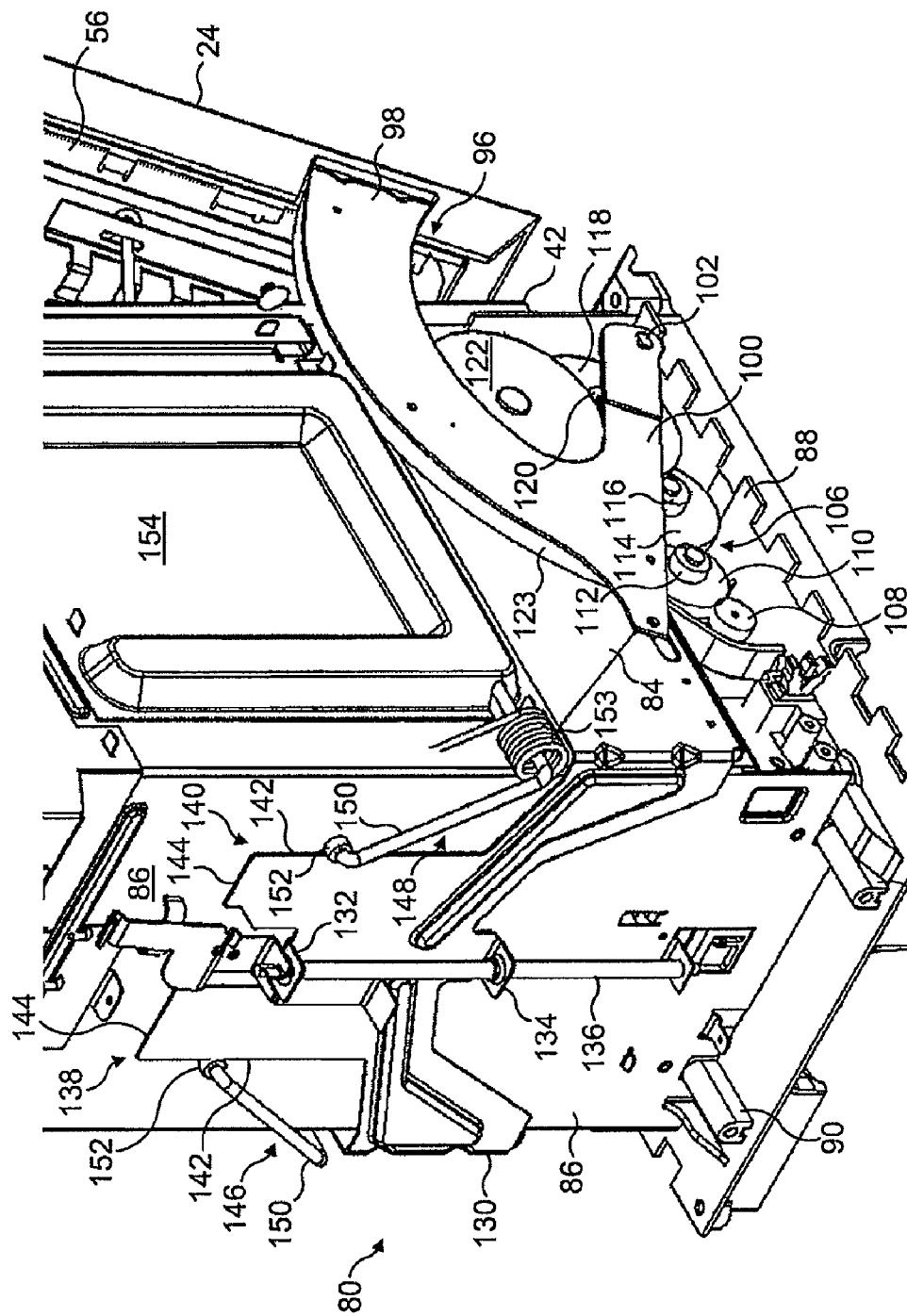
FIG. 5 is a perspective view of part of one side and rear of the inner cabinet of the appliance when the door is in an open position.

Referring now to FIG. 5, the lower part of the rear and one side of the toaster 10 is shown, with the outer cabinet 12 removed to reveal an inner cabinet 80 of the toaster 10. The inner cabinet 80 comprises a chassis having side walls 82, 84 and a rear wall 86 which is preferably integral with the side walls 82, 84. The front plate 42 is connected between the side walls 82, 84 of the chassis. The chassis is mounted on a base 88 of the inner cabinet 80, the base 88 being profiled to be located over the base 22 of the outer cabinet 12. Parallel guide rails 90, 92 are located between the chassis and the base 88 of the inner cabinet 80 to guide movement of the drawer as it is removed from, and replaced in, the toaster 10.

FIG. 5 illustrates a drive mechanism for moving the door 24 between the open position and the closed position. The drive mechanism comprises two door arms 94, 96, each connected to a respective side of the panel 56 of the door 24. Each door arm 94, 96 comprises an arcuate member 98 and a lever 100 integral with the arcuate member 98. The arcuate member 98 extends forwardly from the lever 100 to the panel 56, to which it is affixed. The lever 100 extends rearwardly from the front surface of the chassis towards the rear wall 86 thereof. The lever 100 of door arm 96 is pivotably connected to side wall 84 of the chassis at pivot 102 located near the front surface of the chassis; the lever 100 of door arm 94 is similarly connected to side wall 82 of the chassis.

Figure 13:
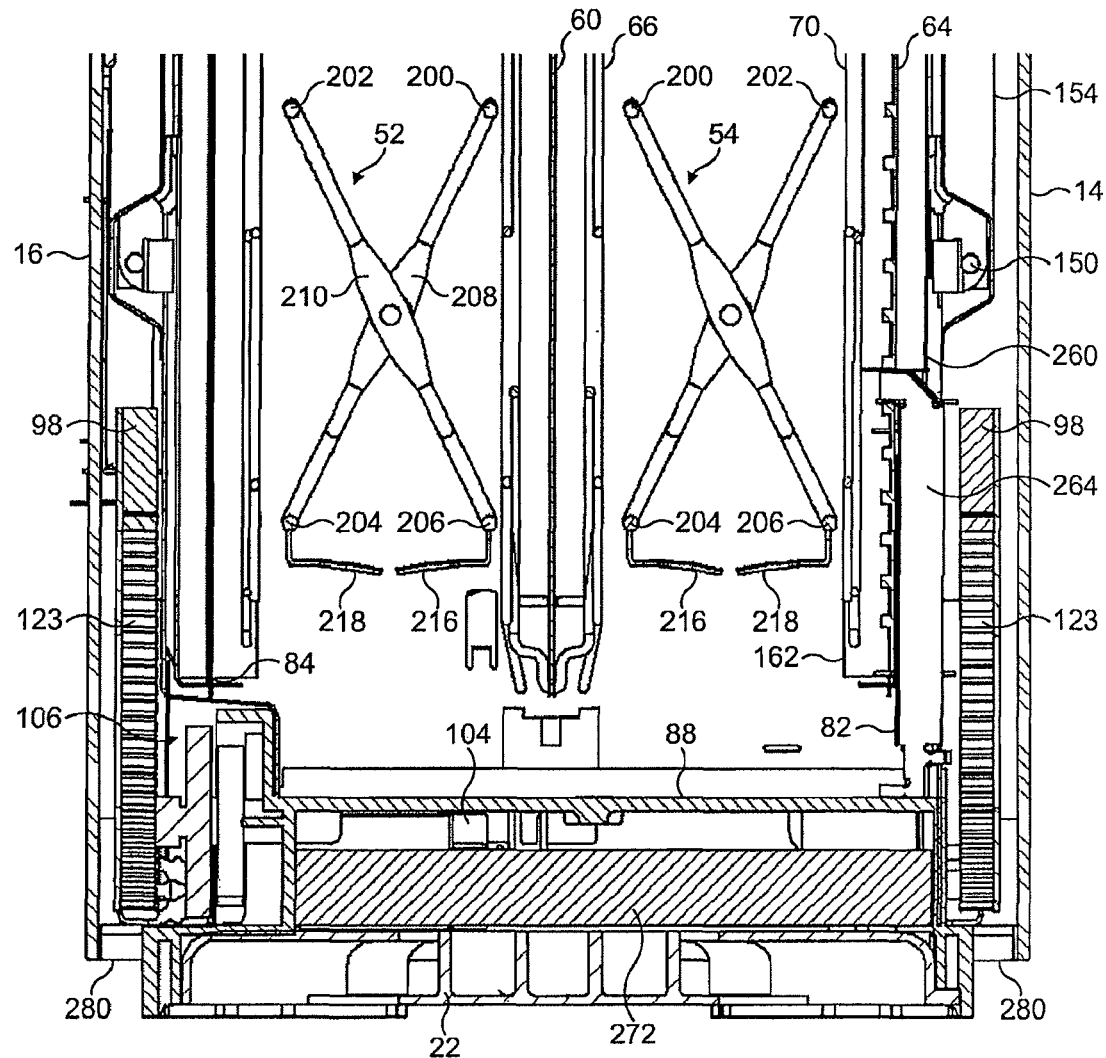
FIG. 13 is a front section view of the appliance, illustrating components of a system for detecting the degree of browning of a foodstuff during a toasting operation.

The drive mechanism for moving the door 24 further comprises a door drive motor 104. As indicated in FIG. 13, the door drive motor 104 is preferably located between the base 88 of the inner cabinet 80 and the base 22 of the toaster 10 to shield the door drive motor 104 from the heat generated during a toasting operation and from crumbs falling from the foodstuff during the toasting process. The door drive motor 104 is preferably mounted to the lower surface of the base 88 of the inner cabinet 80. The drive door motor 104 is arranged to drive a gear assembly 106. The gear assembly 106 comprises a gear 108 connected to the drive shaft of the door drive motor 104. The gear assembly 106 further comprises a plurality of additional gears 110, 114, 118 which are rotatably mounted to the base 88 of the inner cabinet 80. Teeth of the gear 108 mesh with teeth of a first spur gear 110. A first side gear 112 is integral with the first gear 110, and has teeth which mesh with the teeth of a second spur gear 114. The second spur gear 114 is larger than the first spur gear 110. A second side gear 116 is integral with the second spur gear 114, and has teeth which mesh with the teeth of a third spur gear 118. The third spur gear 118 is larger than the second spur gear 114. A third side gear 120 is integral with the third spur gear 118. The gear assembly 106 also comprises a fourth spur gear 122 having teeth which mesh with the teeth of the third side gear 120 so that, with activation of the door drive motor 104, the gear assembly 106 drives the fourth spur gear 122 to rotate at an angular speed which is lower than the speed of the drive door motor 104. The teeth of the fourth spur gear 122 mesh with the teeth of an arcuate ring gear 123 attached to the inner surface of the door arm 96 to cause the door arm 96 to rotate upon activation of the door drive motor 104 to move the door 24 between the open position and the closed position.

The drive mechanism for moving the door 24 forms part of a mechanism for moving the movable heating elements 62, 64 towards the stationary heating element 60. With reference again to FIG. 5, the end of each lever 100 which is remote from the pivot 102 is pivotally connected to a guide plate 130. The guide plate 130 wraps around the side walls 82, 84 and the rear wall 86 of the chassis. Vertically spaced flanges 132, 134 extend horizontally from the rear portion of the guide plate 130 that extends along the rear wall 86 of the chassis. Each of the flanges 132, 134 has an aperture, the apertures being aligned and arranged to receive a guide rod 136. The guide rod 136 is attached to, and extends vertically down, the rear wall 86 of the chassis. The guide plate 130 is moveable relative to the guide rod 136 so as to slide up and down the guide rod 136, with the guide rod 136 inhibiting sideways movement of the guide plate 130.

The rear portion of the guide plate 130 is shaped to define two symmetrical cam surfaces 138, 140 located on opposite sides of the rear portion of the guide plate 130. Each of the cam surfaces 138, 140 comprises an upwardly extending, substantially vertical surface 142 and an inwardly extending, substantially horizontal surface 144. Each cam surface 138, 140 is engaged by a respective cam follower 146, 148. Each cam follower 146, 148 comprises an L-shaped lever arm 150 which extends around the rear wall 86 and a respective side wall 82, 84 of the chassis. Each lever arm 150 has a ring 152 of low friction coefficient material rotatably mounted on one end thereof for engaging the cam surface 138, 140. A torsion spring 153 extending about the lever arm 150 urges the ring 152 against the cam surface 138, 140. The side portion of each lever arm 150 passes through an aperture located in the lower part of a cover plate 154 for a respective moveable heating element 62, 64, each cover plate being attached to a respective side wall 82, 84 of the chassis. With reference to FIG. 4, the side portion of each lever arm 150 also passes through apertures located in a horizontally spaced first pair of flanges 155 extending outwardly from a respective side wall 82, 84 of the chassis to enable the lever arm 150 to rotate relative to its respective side wall 82, 84.

Figure 6:
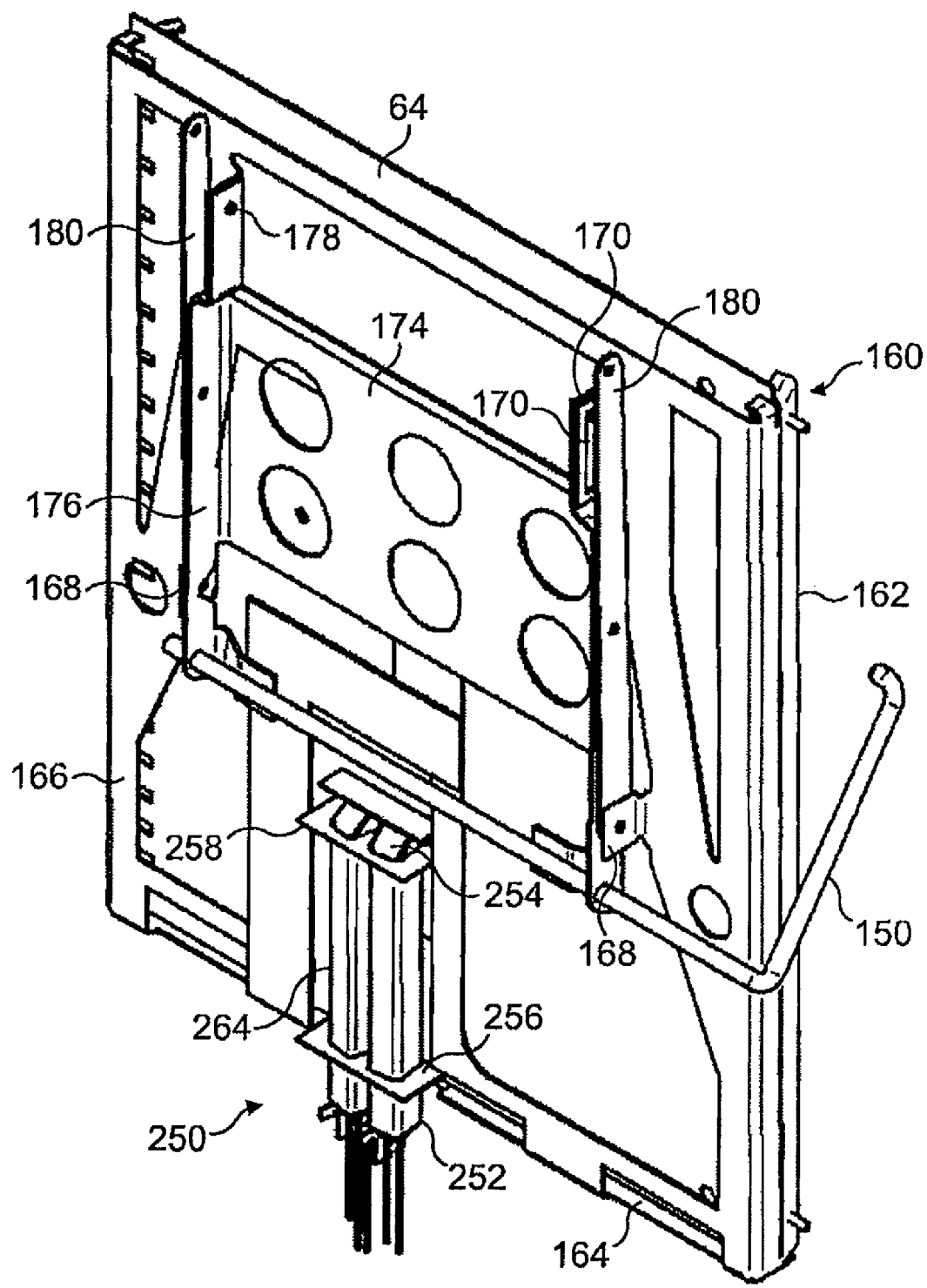
FIG. 6 is a perspective rear view of part of mechanism for moving a moveable heating element of the appliance.

A moveable heating element 62, 64 is connected to the side portion of a lever arm 150 of respective cam follower 146, 148. The connection of the moveable heating element 64 to the lever arm 150 of cam follower 146 is illustrated in FIG. 6; moveable heating element 62 is similarly connected to the lever arm 150 of cam follower 148. The moveable heating element 64 is held by a bracket 160 which has a side surface 162 and a bottom surface 164 shaped to engage the periphery of the moveable heating element 64 and a profiled rear surface 166 extending along the rear surface of the moveable heating element 64. The grille 70 may be connected to the side surface 162 of the bracket 160 so as to lie slightly in front of the heating element 64 and to move with the heating element 64. A first pair of horizontally spaced flanges 168 and a second pair of horizontally spaced flanges 170 extend vertically from the rear surface 166. The second pair of flanges 170 is located above the first pair of flanges 168. Each of the second pair of flanges 170 comprises a vertically extending slot 172.

A drive plate 174 is connected to the bracket 160. The drive plate 174 comprises two side arms 176 integral therewith. The lower end of each side arm 176 comprises an aperture for receiving the side portion of the lever arm 150 so that the side aims 176 are connected to the lever arm 150. The upper end of each side arm 176 carries a pin 178 which extends into the slot 172 of a respective flange 170 for sliding movement therein. Each side arm 176 is pivotally connected at its mid-point to a respective drive arm 180. The lower end of each drive aim 180 is connected to a respective one of the first pair of flanges 168. With reference also to FIG. 4, the upper end of each drive arm 180 carries a pin 182 which is slidably moveable inside a slot 184 of a respective one of a second pair of horizontally spaced flanges 186 extending outwardly from the side wall 82 of the chassis, with the second pair of flanges 186 on the side wall 82 being located above the first pair of flanges 170 on the side wall 82.

FIG. 4 shows the relative positions of the movable heating elements 62, 64 when the door 24 is in an open position. When the door 24 is in its open position, the moveable heating elements 62, 64 are at their maximum spacing from the stationary heating element 60.

Figure 7:
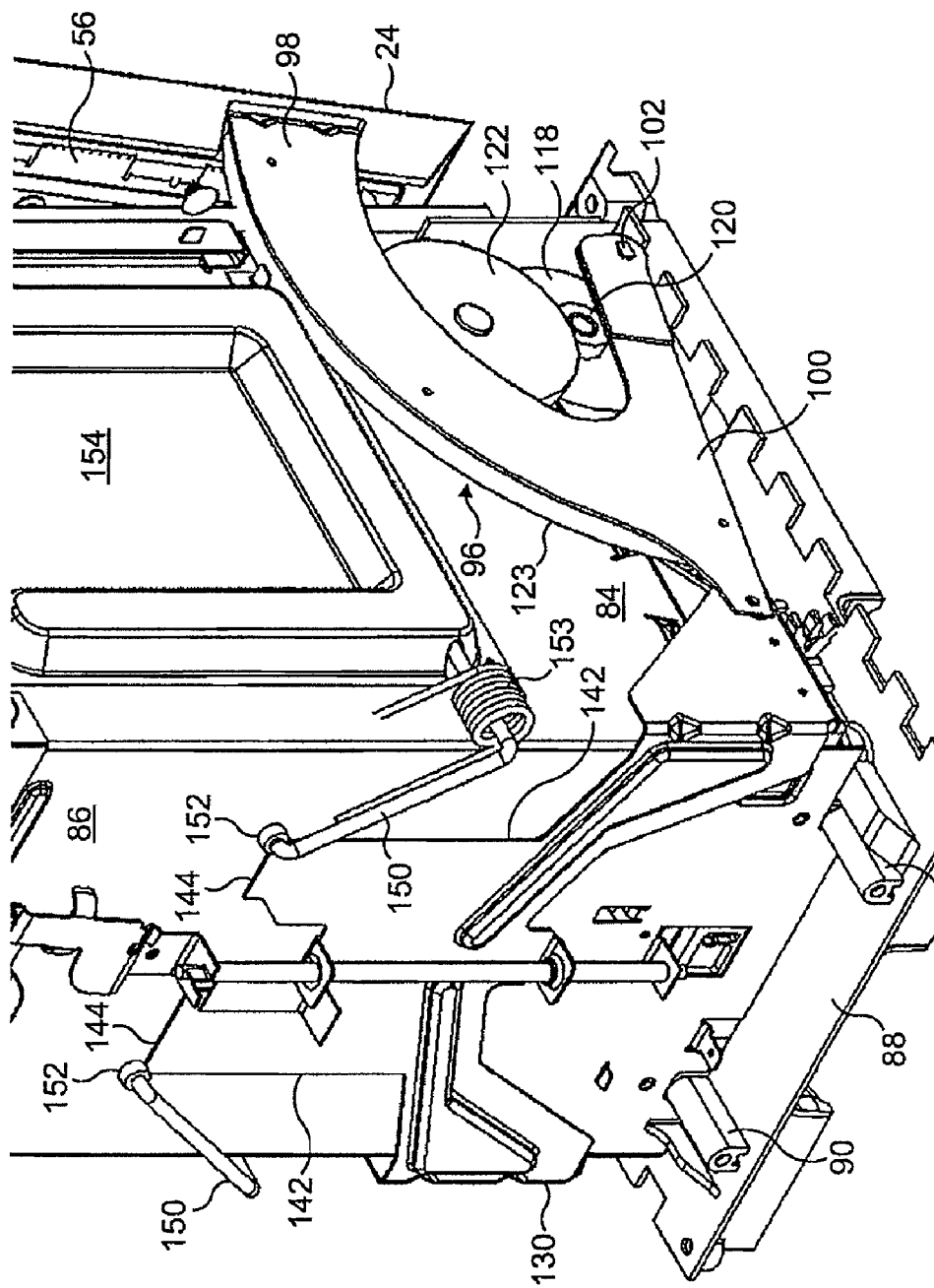
FIG. 7 is a perspective view of FIG. 5 when the door is in a partially open position.

FIG. 7 shows the same features as FIG. 5, but with the door 24 in a position intermediate the open position and the closed position. The door drive motor 104 has been energised, causing the gear assembly 106 to rotate which in turn causes the door arms 94, 96 to rotate to move the door 24 towards its closed position. With rotation of the door arms 94, 96, the levers 100 of the door arms 94, 96 pivot anticlockwise (as illustrated) about pivots 102 to lower the ends of the levers 100 remote from the pivots 102. The guide plate 130, being attached to the levers 100, is urged downwards. In this figure, the guide plate 130 has traveled part way down the guide rod 136. The action of the torsion springs 153 on the lever arms 150 causes the rings 152 to travel up the vertical surfaces 142 of the cam surfaces 138, 140 as the guide plate 130 moves down. In the position illustrated in FIG. 7, the rings 152 are located substantially at the corners between the vertical surfaces 142 and the horizontal surfaces 144 of the cam surfaces 138, 140. The orientation of the lever arms 150 has not changed, and so the moveable heating elements 62, 64 remain in the positions shown in FIG. 4.

Figure 8:
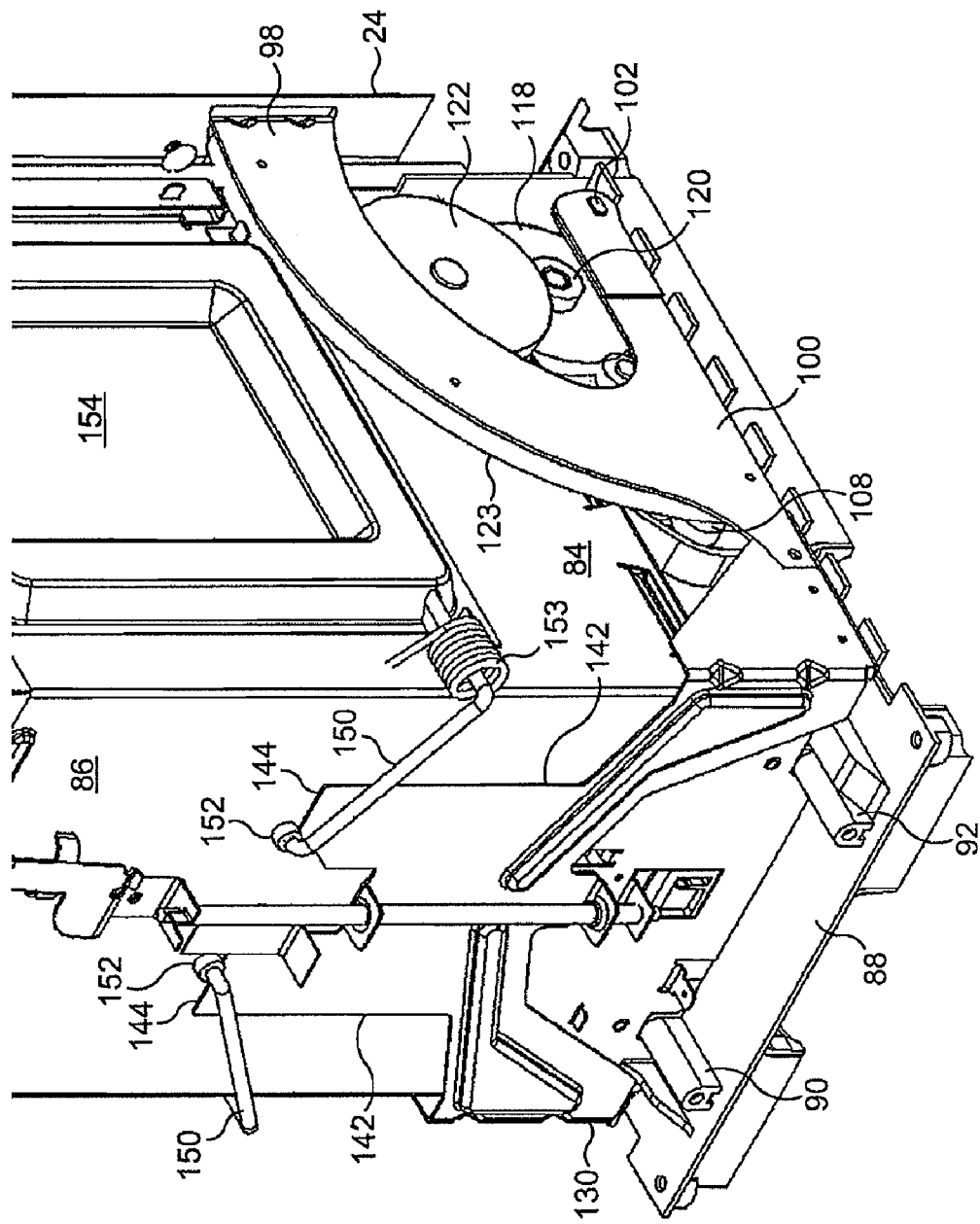
FIG. 8 is a perspective view of FIG. 5 when the door is in the closed position.
Figure 9:
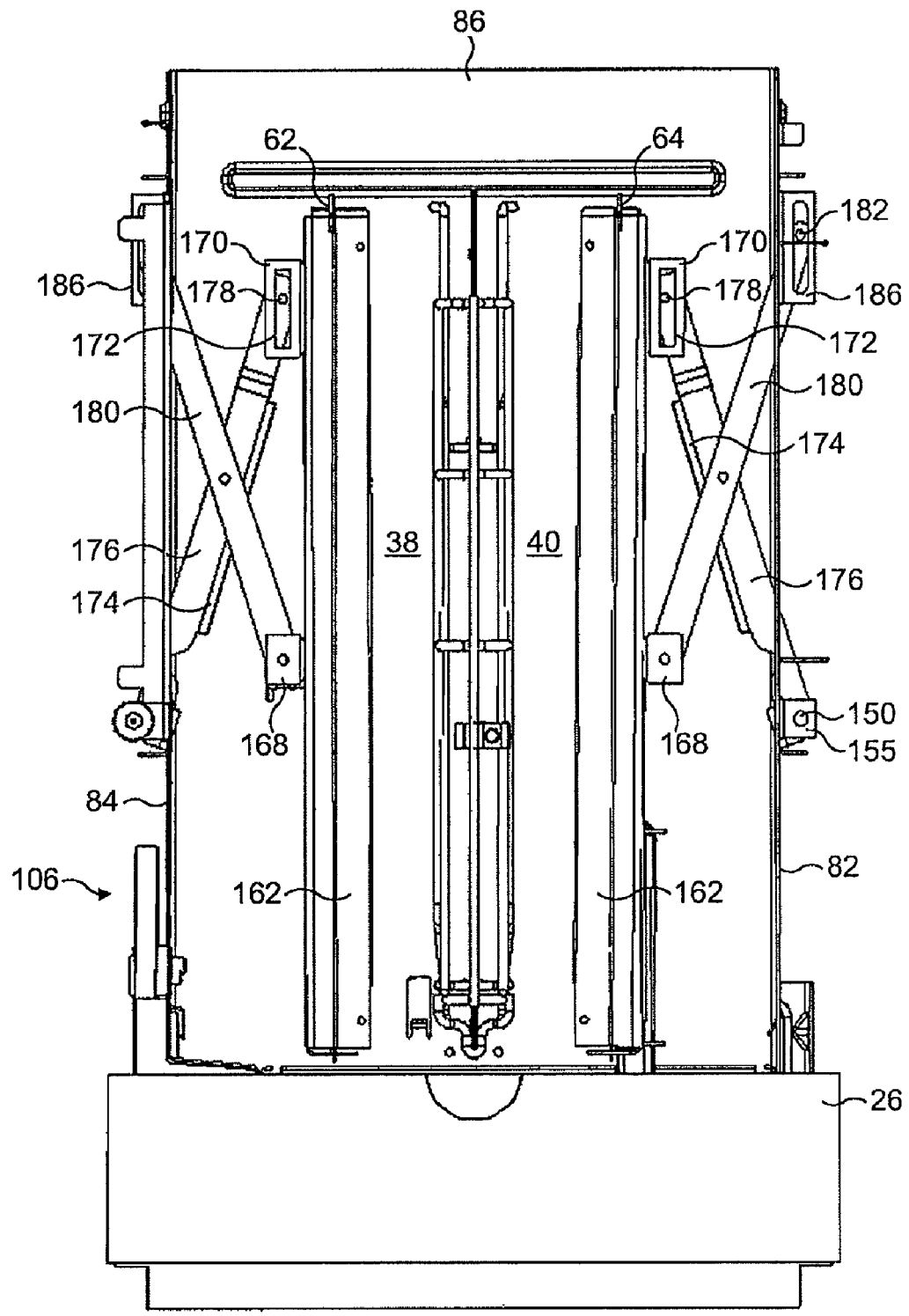
FIG. 9 is a front view of the inner cabinet of the appliance, illustrating a position of the moveable heating elements when the door is in the closed position.

FIG. 8 shows these features of FIG. 7 when the door 24 is in the closed position, with FIG. 9 showing the relative positions of the movable heating elements 62, 64 when the door 24 is in the closed position (and with no foodstuffs within the toasting chamber 36). The door drive motor 104 has been energised further, causing the gear assembly 106 to rotate which in turn causes the door arms 94, 96 to rotate to move the door 24 to its closed position. With this further rotation of the door arms 94, 96, the levers 100 of the door arms 94, 96 continue to pivot anticlockwise (as illustrated) about pivots 102 to lower the ends of the levers 100 remote from the pivots 102 to their lowest position. The guide plate 130 is urged downwards to its lowest position, in which its lower surface is adjacent the base 88 of the inner cabinet 80 and the flange 132 is located adjacent the lower end portion of the guide rod 136. The force of the torsion springs 153 acting on the lever arms 150 causes the rings 152 to travel inwardly along the horizontal surfaces 144 of the cam surfaces 138, 140, causing the lever arms 150 to rotate about the longitudinal axes of their side portions towards the toasting chamber 36. With reference to FIG. 9, rotation of the lever arms 150 towards the toasting chamber 36 causes the cover plates 174 and the drive arms 180 to move with a scissors-type action, which in turn causes the brackets 160, and thus the moveable heating elements 62, 64, to move towards the stationary heating element 60 and in a manner which maintains the moveable heating elements 62, 64 substantially parallel to the stationary heating element 60.

Figure 10:
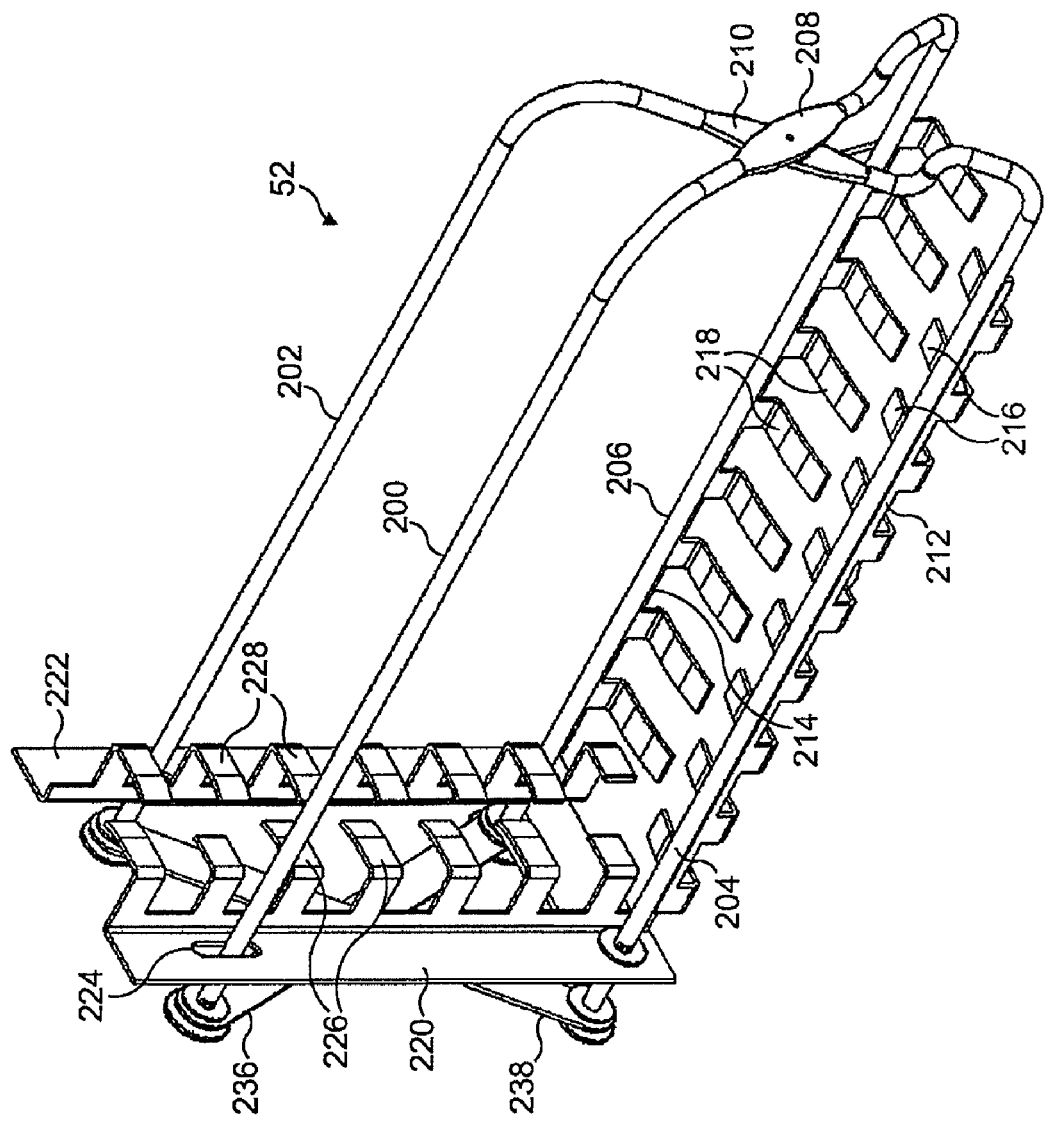
FIG. 10 is a perspective rear view of a carriage of the appliance.
Figure 11:
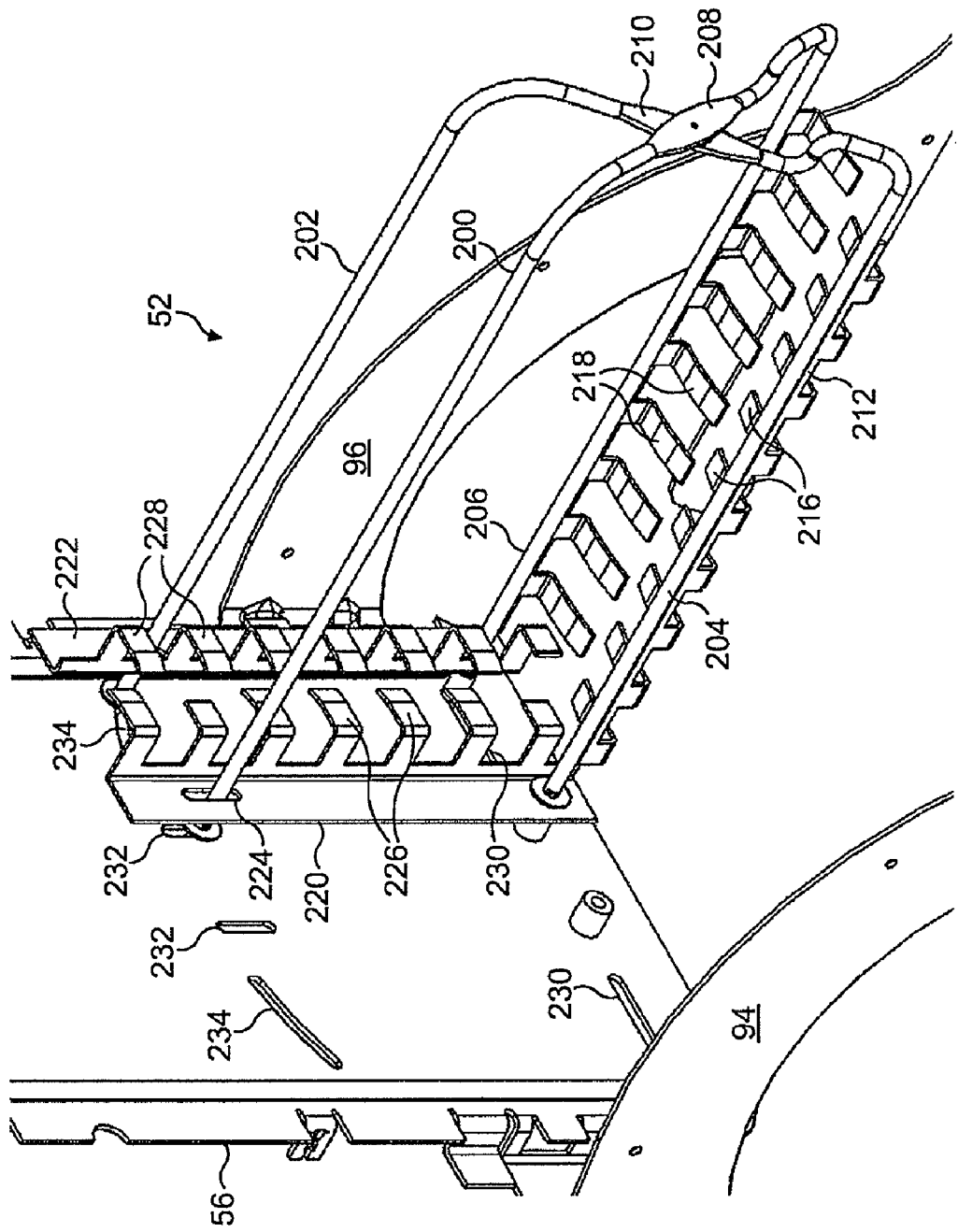
FIG. 11 is a rear perspective view of the carriage of FIG. 10 in an expanded form and attached to a panel of the door of the appliance.
Figure 12:
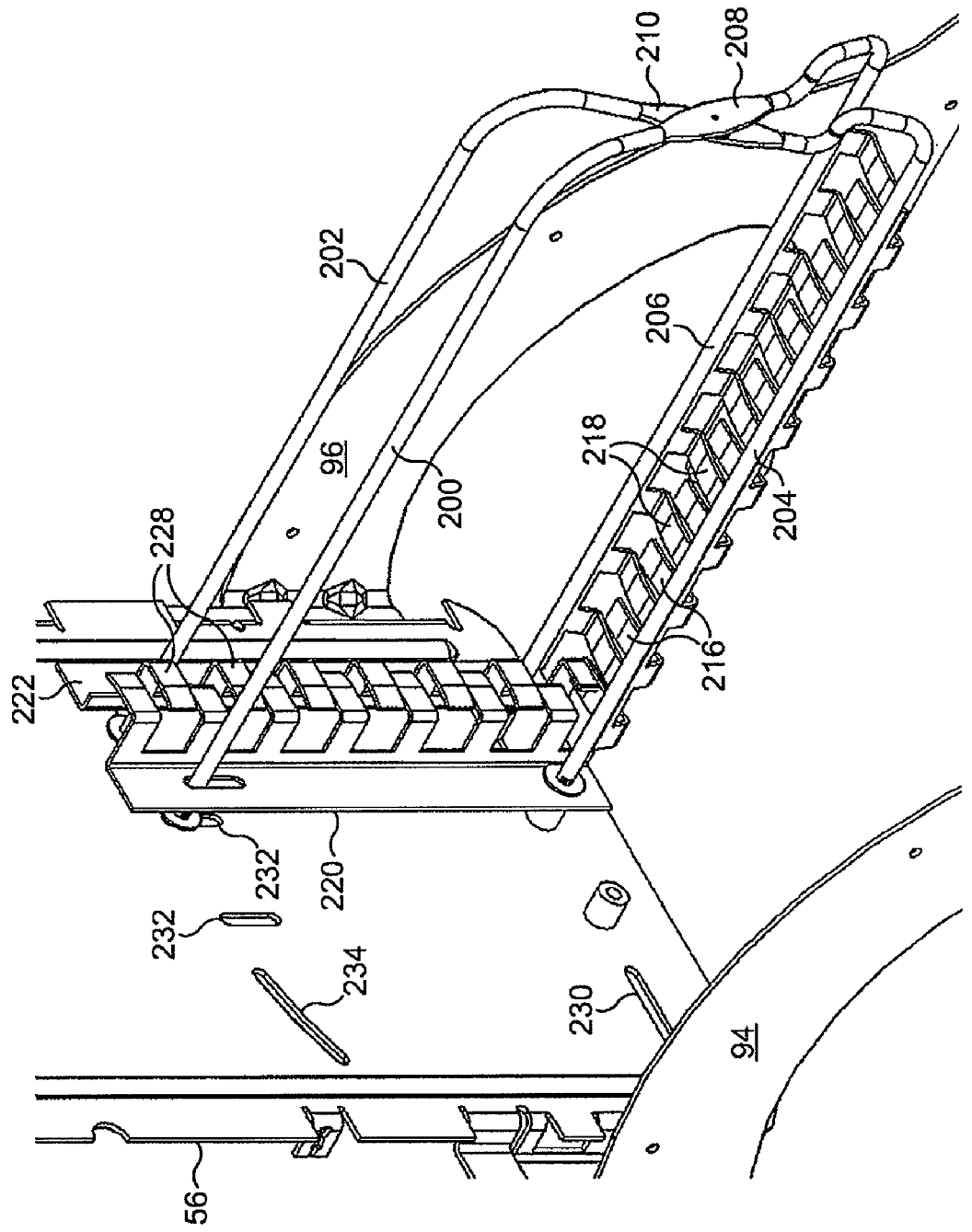
FIG. 12 is a rear perspective view of the carriage of FIG. 10 in a contracted form and attached to a panel of the door of the appliance.

FIGS. 10 to 12 illustrate one of the carriages 52 in more detail. The other carriage 54 is constructed in a similar fashion. The carriage 52 comprises four elongated rails 200, 202, 204 and 206. The rails are substantially parallel. Upper rail 200 and lower rail 206 are attached to one another by an integral connecting member 208 located to the ends of the rails 200, 206 which are remote from the door 24. Upper rail 202 and lower rail 204 are similarly attached to one another by an integral connecting member 210 located to the ends of the rails 202, 204 which are remote from the door 24. The connecting members 208, 210 are pivotably connected together at their mid-points so that the carriage 52 can move between an expanded form, as shown in FIG. 11, and a contracted form, as shown in FIG. 12, with a scissors-type action which retains upper rail 200 substantially vertically above lower rail 204 and upper rail 202 substantially vertically above lower rail 206. In the expanded form the spacing between the upper rails 200, 202 is in the range from 28 to 35 mm to enable the carriage 54 to receive a wide range of foodstuffs having various different thicknesses. In the contracted form, the spacing between the upper rails 200, 202 is in the range from 5 to 10 mm, which is generally smaller than the thickness of foodstuffs typically cooked inside a domestic toaster.

The carriage 52 comprises two lower bread supports 212, 214 for supporting the lower surface of a foodstuff inserted therein. The first lower bread support 212 is attached to lower rail 204, and the second lower bread support 214 is attached to lower rail 206. Each lower bread support 212, 214 comprises a respective plurality of fingers 216, 218 which extend towards the other lower bread support 214, 212. The fingers 216, 218 are arranged so that the fingers 216 of the first lower bread support 212 are horizontally staggered with respect to the fingers 218 of the second lower bread support 214 so that the fingers 216, 218 interleave as the carriage 52 moves towards its contracted form.

The carriage 52 further comprises two side bread supports 220, 222 for supporting a side surface of a foodstuff inserted therein. The first side bread support 220 is connected between the vertically spaced upper rail 200 and lower rail 204, and the second side bread support 222 is connected between the vertically spaced upper rail 202 and lower rail 206. Each side bread support 220, 222 is rigidly connected to its respective lower rail 204, 206, while its respective upper rail 200, 202 is able to slide within a vertical slot 224 formed in the side bread support 220, 222 as the carriage 52 moves between its expanded and contracted forms. Each side bread support 220, 222 comprises a respective plurality of fingers 226, 228 which extend towards the other side bread support 222, 220. The fingers 226, 228 are arranged so that the fingers 226 of the first side bread support 220 are vertically staggered with respect to the fingers 228 of the second side bread support 222 so that the fingers 226, 228 interleave as the carriage 52 moves towards its contracted form.

As mentioned above, the carriages 52, 54 are connected to the inner surface of the door 24. With reference to FIGS. 11 and 12, the inner surface of the door 24 is preferably in the form of a panel 56 attached to the door 24, with a heat shield located therebetween. The end of the lower rail 204 which is proximate the door 24 is rigidly attached to the panel 56 so that it extends substantially orthogonal therefrom towards the toasting chamber 36. The end of the lower rail 206 which is proximate the door 24 passes through a substantially horizontal slot 230 formed in the panel 56 to allow the lower rail 206 to move towards the lower rail 204 as the carriage 52 contracts. The end of the upper rail 200 which is proximate the door 24 passes through a substantially vertical slot 232 formed in the panel 56 to allow the upper rail 200 to move away from the lower rail 204 as the carriage contracts. The end of the upper rail 202 which is proximate the door 24 passes through a curved slot 234 formed in the panel 56 to allow the upper rail 202 to move both away from the lower rail 206 and towards the upper rail 200 as the carriage 54 contracts. These ends of the upper rail 200 and the lower rail 206 are connected together by a first connecting arm 236 located between the door 24 and the panel 56, and the corresponding ends of the upper rail 202 and the lower rail 204 are similarly connected together by a second connecting arm 238 located between the door 24 and the panel 56. The connecting arms 236, 238 are pivotably connected together at their mid-points so that the rails 200, 202, 204, 206 remain substantially parallel as the carriage 52 moves between its expanded and contracted forms. A torsion spring (not shown) is also located between the door 24 and the panel 56. The torsion spring is connected between the upper rails 200, 202 and is biased so as to urge the upper rails 200, 202 apart and thus to urge the carriage 52 towards its expanded form.

When the door 24 is in its open position, the bread support surfaces 212, 214, 220, 222, are tilted from the horizontal and vertical axes due to the angled orientation of the door 24. When the door 24 is in its closed position, the lower support surfaces 212, 214 are substantially horizontal and the side support surfaces 220, 222 are substantially vertical.

With reference now to FIG. 6 and FIGS. 13 to 15, the toaster 10 includes a system for controlling the degree of browning of the foodstuff during the toasting operation. This system comprises an optical system 250 for illuminating optically the foodstuff and for detecting radiation reflected from the foodstuff. As illustrated in FIG. 6, at least part of the optical system 250 is mounted on the bracket 160 supporting moveable heating element 64 so that that part of the optical system 250 is moveable with the moveable heating element 64 towards and away from a foodstuff located within sub-chamber 40 of the toasting chamber 36.

The optical system 250 comprises a first light guide in the form of a first light pipe 252 for conveying light to the sub-chamber 40. The first light pipe 252 is preferably formed from a metallic material, and has an internal reflective surface. A preferred material for the first light pipe 252 is bright annealed stainless steel, which is a stainless steel which, after cold rolling, has been annealed in a protective gas that prevents oxidation of its surface. This material is relatively cheap and able to withstand repeated exposure to the elevated temperature of the toasting chamber 36 during a toasting operation. Other preferred materials are polished aluminium, and mild steel having a surface which has been coated with a reflective layer, for example using a deposition or a plating technique. The opaque nature of the material of the first light pipe 252 means that carbon deposits formed on the outer surface of the first light pipe 252 during a toasting operation do not impair the transmission of light thereby. The first light pipe 252 is preferably formed from folded sheet material, or from extruded material.

The first light pipe 252 is right angled towards the open upper end thereof to direct light into the sub-chamber 40. Angled reflective surface 254 directs light travelling upwardly within the main body of the first light pipe 252 towards the sub-chamber 40. The first light pipe 252 is supported by vertically spaced flanges 256, 258 extending outwardly from, or connected to, the rear surface of the bracket so that the mechanism for moving the heating element 64 towards and away from the carriage 54 also serves to move the light pipe 252 towards and away from the carriage 54, and thus the foodstuff located in the carriage 54.

Figure 14:
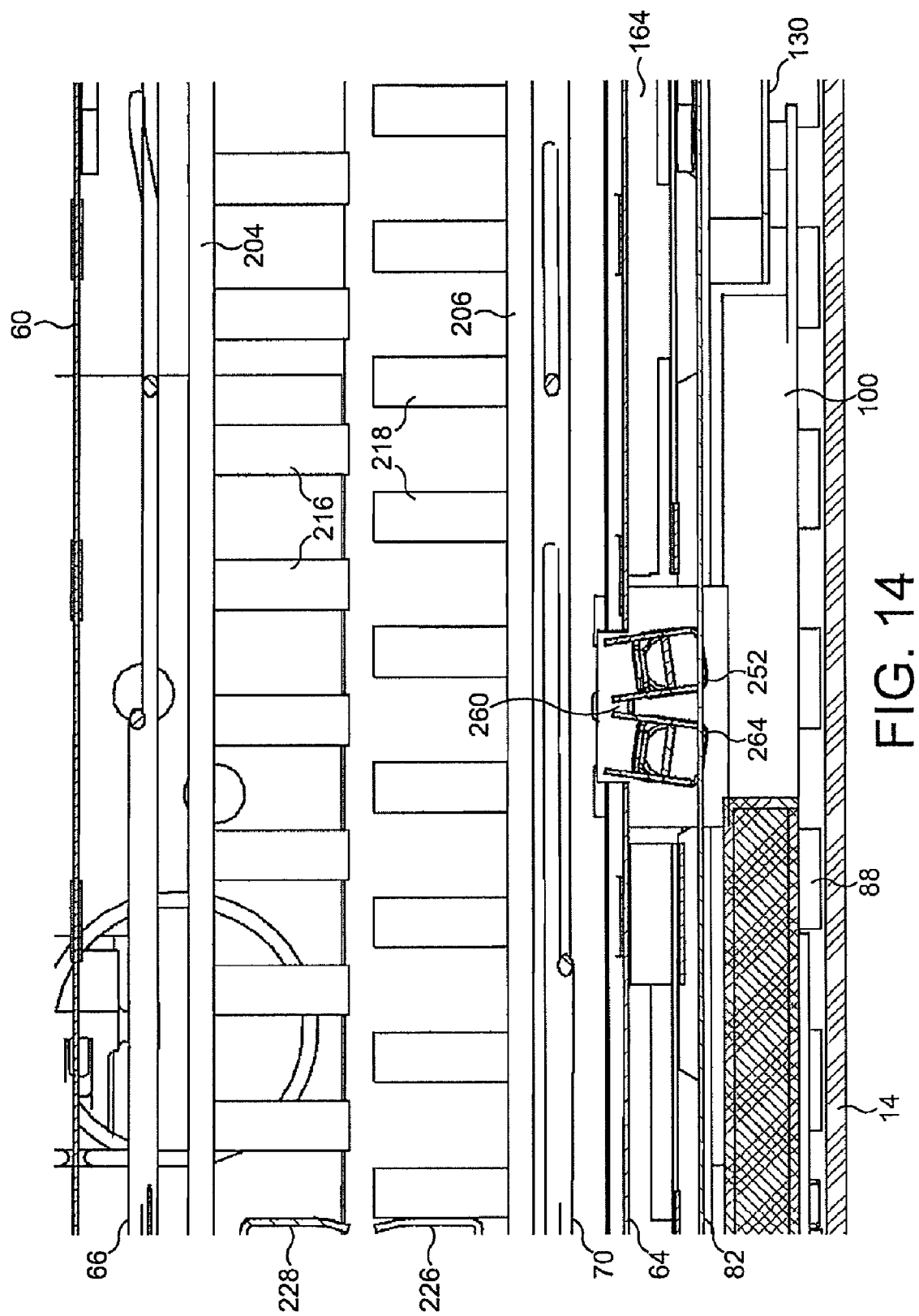
FIG. 14 is a plan sectional view of part of the appliance, again illustrating components of the system for detecting the degree of browning of a foodstuff during a toasting operation.

With reference to FIGS. 13 and 14, the first light pipe 252 partially extends through an aperture 260 formed in the moveable heating element 64 to illuminate the surface of the foodstuff facing the moveable heating element 64 at an incident angle in the range from 5 to 20°. The first light pipe 252 houses a light source for illuminating a foodstuff located within the sub-chamber 40 of the toasting chamber 36. In this example the light source comprises a green LED 262, which may be located towards the lower open end of the first light pipe 252 so as to be positioned lower than the moveable heating element 64. The green LED 262 is preferably arranged to emit strobed radiation to reduce interference effects from ambient illumination sources, such as fluorescent lighting, on the optical system 250.

The optical system 250 further comprises a second light guide in the form of a second light pipe 264 for receiving light reflected from a foodstuff located in the sub-chamber 40. The second light pipe 264 is preferably substantially identical to the first light pipe 252, and is mounted alongside the first light pipe 252 so that the light ports at the open upper ends thereof are substantially co-planar. The second light pipe 264 houses an optical receiver 266 for receiving the reflected light, and which may be located towards the lower open end of the second light pipe 264. The optical receiver 266 may be in the form of a photodiode, a phototransistor or a light dependent resistor.

In this example, the second light pipe 264 also houses a red LED 268 for illuminating the optical receiver 266. The red LED 268 may be located towards the lower open end of the second light pipe 264, alongside the optical receiver 266. The red LED 268 may also be arranged to emit strobed radiation.

In this example, the optical system 250 is arranged to illuminate a single sub-chamber 40 of the toasting chamber 36. However, a second optical system may also be mounted on the bracket 160 holding the moving heating element 62 to illuminate sub-chamber 38 of the toasting chamber 36.

Figure 15:
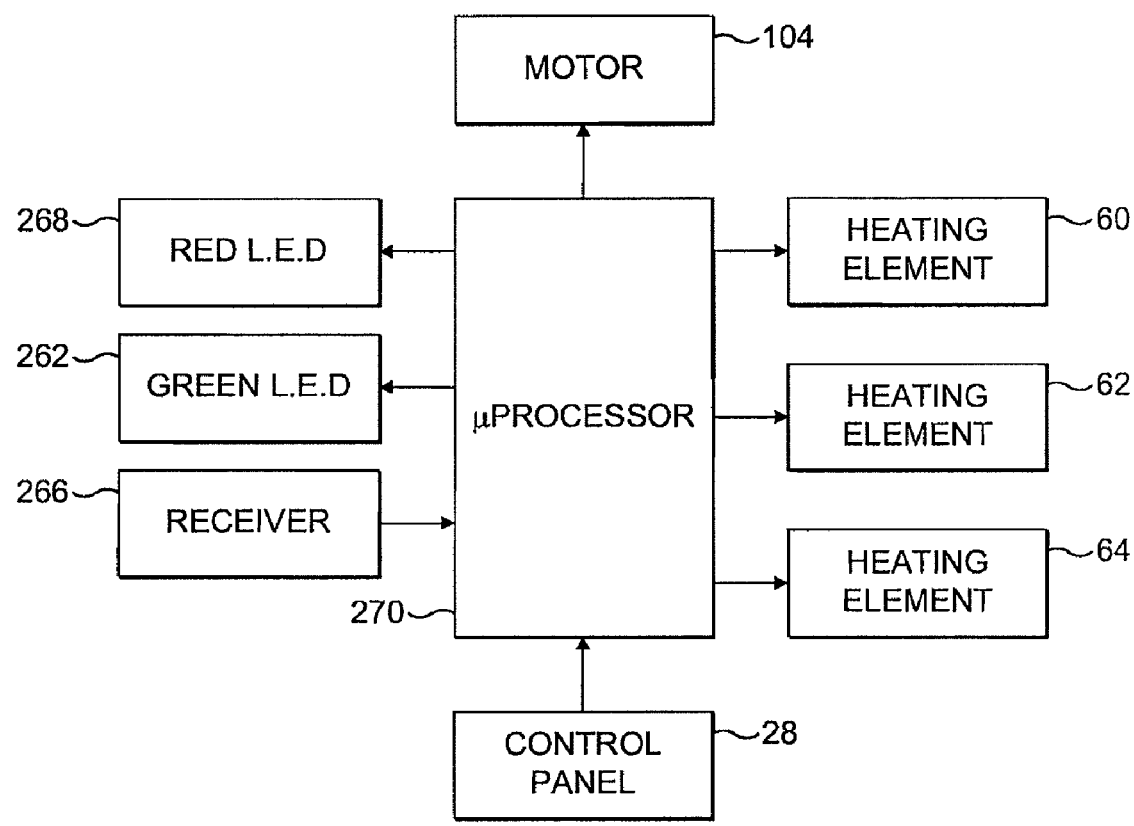
FIG. 15 is a schematic illustration of a control system for controlling a toasting operation.

FIG. 15 illustrates schematically a control system for controlling a toasting operation. The control system comprises a controller in the form of a microprocessor 270, which is mounted on a circuit board 272 located between the base 22 of the outer cabinet 12 and the base 88 of the inner cabinet 80 so as to be shielded from the heat generated within the toasting chamber 36 during a toasting operation. In this example, the microprocessor 270 controls the operation of the heating elements 60, 62, 64, the door drive motor 104 and the LEDs 262, 268. The microprocessor 270 also receives signals from the control panel 28 and the optical receiver 266. The microprocessor 270 preferably comprises an internal oscillator for controlling the timing of signals output therefrom. A low voltage supply (not shown) provides electrical power to the microprocessor 270. The low voltage supply is connected to a mains power supply by a cable extending from the base 22 of the toaster 10, the mains power supply also being connected to the heating elements 60, 62, 64 for the supply of electrical power thereto.

A toasting operation is carried out as follows. The user firstly presses the appropriate button on the control panel 28 to move the door 24 to its open position. In response to a signal output from the control panel 28, the microprocessor 270 energises the door drive motor 104 to rotate the gear assembly 106 to cause the drive arms 98, 100 to move to the position illustrated in FIG. 5. The user then inserts the foodstuff to be toasted into the carriages 52, 54. If there is only a single item of foodstuff to be toasted, the user inserts this item of foodstuff into the carriage 54 so that the item of foodstuff is illuminated by the optical system 250. The user then presses the appropriate button on the control panel 28 to move the door 24 to its closed position. One button may be employed for moving the door 24 between its open and closed positions. The door drive motor 104 is energised again, but this time runs in the opposite direction in order to rotate the gear assembly to movement of the door 24 to its closed position. As the door 24 pivots to the closed position, it carries the carriages 52, 54 through the openings 44, 46 formed in the front plate 42 and into the sub-chambers 38, 40 of the toasting chamber 36. The bevelled edges 48, 50 serve to guide the foodstuff into the toasting chamber 36. Absent the bevelled edges 48, 50 of the openings 44, 46, there is an increased risk that the foodstuff may become trapped between the front face 42 of the chassis and the door 24 as the door 24 moves towards the closed position, potentially damaging the foodstuff and/or overloading or otherwise damaging the door drive motor 104 or the gear assembly 106.

Once the door 24 has moved to the position illustrated in FIG. 7, the lever arms 150 begin to rotate as the guide plate 130 descends with further movement of the door 24 towards its closed position to move the moveable heating elements 62, 64 towards the stationary heating element 60. As the moveable heating elements 62, 64 move within the toasting chamber 36, the side edges 162 of the brackets 160 retaining the moveable heating elements 62, 64 come to bear against the carriages 52, 54. The force of the torsion spring 153 acting on each lever arm 150 is sufficient to overcome force of the torsion springs of the carriages 52, 54 so that, with continued movement of the door 24 towards its closed position, the moveable heating elements 62, 64 continue to move towards the stationary heating element 60 while simultaneously urging the carriages 52, 54 from their expanded forms, as illustrated in FIG. 11, towards their contracted forms, as illustrated in FIG. 12.

As the carriages 52, 54 are urged towards their contracted forms by the movement of the heating elements 62, 64, the inner surfaces of the rails 200, 202, 204 206 come into contact with and bear against the side surfaces of the foodstuff located therebetween. If items of foodstuff of different thicknesses are inserted within the carriages 52, 54, the bearing of the rails 200, 202, 204 206 against the foodstuff will occur at respective different positions of the door 24 as it moves towards its closed position. When, for example the rails of carriage 52, comes in contact with foodstuff located within carriage 52, the increased resistance presented by the combination of the foodstuff and the carriage 52 to the movement of the moveable heating element 62 overcomes the biasing force of the torsion spring 153. This inhibits further rotational movement of the lever arm 150 connected to moveable heating element 62. Consequently, the ring 152 mounted on the lever arm 150 becomes disengaged from the horizontal surface 144 of the cam surface 140 with further descent of the guide plate 130 as the door 24 continues to move towards the closed position. As a result, further movement of the moveable heating element 62, 64 towards the stationary heating element 60 is inhibited. The moveable heating element 64 continues to move towards the stationary heating element 60 until its movement is similarly arrested.

The moveable heating elements 62, 64, and the light pipes 252, 264 of the optical system 250, thus move by an amount which is dependent on the thickness of the foodstuffs located in the sub-chamber 38, 40 of the toasting chamber 36. Hence, once the door 24 is in the closed position the heating elements 60, 62, 64 occupy positions in which the spacing between the heating elements 60, 62, 64 and the adjacent surfaces of the foodstuffs located therebetween is substantially constant over a wide range of thicknesses of the foodstuffs to be toasted. Similarly, the outlet ports of the light pipes 252, 264 mounted on the moving heating element 64 have a substantially constant spacing from the illuminated surface of the foodstuff located within the sub-chamber 40 of the toasting chamber 36. Furthermore, each carriage 52, 54 adjusts automatically to support closely the foodstuff located therein.

With the door 24 in its closed position, the heating elements 60, 62, 64 are energised to commence a toasting operation. This may be arranged to occur automatically when the door 24 has closed. Alternatively, a button may be provided on the control panel 28 to enable the user to activate the toasting operation subsequent to the closure of the door 24. Buttons may be arranged to permit the user to specify the type of foodstuff being toasted, and/or the manner in which the foodstuff is to be toasted. For example, the user may press a "single side" button when only a single side of the foodstuff is to be toasted, in response to which the microprocessor 270 activates only the moving heating elements 62, 64 during the toasting operation. If the "single item" button has been pressed by the user, the microprocessor 270 activates only the stationary heating element 60 and the moveable heating element 64 to improve heat management within the toasting chamber 36.

In comparison to conventional toasters in which the foodstuff is introduced to the toasting chamber through relatively large slots formed in the upper surface of the toaster, the toasting chamber 36 is a relatively enclosed space. Toasting in an enclosed space is advantageous, as heat energy is retained in the toasting chamber 36, expediting the cooking process. However, it has been found that when bread goes through the so-called Maillard reaction, when sugars in the bread caramelise to form a crunchy browned surface, moisture is driven from the bread. This moisture, if retained in the toasting chamber 36, can be re-absorbed by the bread, leading to soggy toast. In view of this, the inner cabinet 80 of the toaster 10 has an upper surface which comprises an aperture located beneath the air outlet region 30 of the upper surface 16 of the outer cabinet 12 of the toaster 10. This enables hot air to be released from the toasting chamber 36 through the inner apertures 32 of the air outlet region 30 to prevent the build-up of moisture within the toasting chamber 36.

The inner apertures 32 are surrounded by an outer aperture 34 which communicates with a channel formed by the space between the inner cabinet 80 and the outer cabinet 12 of the toaster 10. It is known to provide a cooling airflow in toasting appliances so that the external surface of the appliance is safe for the user to touch, even when the interior of the appliance is hot. Openings, indicated by reference numeral 280 in FIG. 13, are provided around the periphery of the base 22 of the outer cabinet 12 to permit a convection current of ambient air to enter the interior of the toaster 10 during its use. This air flows around the inner cabinet 80 and heat energy is transferred from the chassis of the inner cabinet 80 and the cover plates 154 for the moveable heating elements 62, 64 to the airflow. The air, which by now has absorbed heat energy from the interior of the toaster 10, leaves the toaster 10 through the outer aperture 34 of the air outlet region 30. This flow of air may be arranged to follow a labyrinthine or serpentine path between the inner cabinet 80 and the outer cabinet 12 in order to increase exposure of the airflow to the heat of the toaster 10, thereby cooling the inner cabinet 80 more efficiently.

Therefore, in use, two separate flows of heated air are produced by the toaster 10 and are arranged to exit the toaster 10 via outlet apertures 32, 34 arranged adjacent one another. This simplifies removal of heated air. A further advantage of this arrangement is that the air outlet region 30 provides a warming region at the upper surface 16 of the toaster 10. Foodstuffs may be placed directly on the air outlet region 30 for warming through, or may be placed on a stand (not shown) over the air outlet region 30 in order to space the foodstuff from direct exposure to heat. Foodstuffs, such as buns or pastries, placed on or over the air outlet region 30 could exposed to a combination of warm, moist air from the toasting chamber 36—if there is a foodstuff being toasted within the toasting chamber 36—and warm, dry air from the airflow for cooling the inner cabinet 80. This combination of air flows heats the foodstuff with less tendency for the foodstuff to dry out.

The buttons or a dial on the control panel 28 also allow the user to specify the desired degree of browning of the foodstuff. The microprocessor 270 receives a signal from the control panel 28 which is indicative of the required degree of browning which has been set by the user before the start of the toasting operation. At the start of the toasting operation, the microprocessor 270 activates the green LED 262 to illuminate the surface of the, currently untoasted, foodstuff located within carriage 54. The optical receiver 266 receives light reflected from the surface of the foodstuff, and outputs a signal to the microprocessor 270 which is indicative of the initial intensity, $I_0$, of the reflected light. In response to this signal from the optical receiver 266, the microprocessor 270 varies the intensity of the light emitted from the green LED 262 so that the intensity of the reflected light is at or around a set value, $I_N$, referred to hereafter as the "normalised intensity". In other words, if $I_0$ is greater than $I_N$, for example if the foodstuff is white bread, the microprocessor 270 decreases the intensity of the illumination of the foodstuff until the normalised intensity is reached. On the other hand if $I_0$ is less than $I_N$, for example if the foodstuff is brown bread, the microprocessor 270 increases the intensity of the illumination of the foodstuff until the normalised intensity is reached. Once this set value has been reached, the illumination of the foodstuff by the green LED 262 is maintained at a relatively constant level for the duration of the toasting process. The time required to vary the intensity of the reflected light to the normalised value may be relatively short, in the range from 1 to 5 seconds. Further variation in the intensity of the illumination of the foodstuff by the green LED 262 may be required slightly further into the toasting process, for example at around 30 seconds, to compensate for thermal drift effects, reduced by the user of light pipe 252 to space the green LED 262 from the toaster chamber 36 but which nonetheless tend to increase the intensity of the light emitted by the green LED 262 as the toaster chamber 36 heats up. However, even at this point in the toasting process there is substantially no change in the colour of the foodstuff due to browning. Therefore, the variation of the intensity of the reflected light to the normalised value may take place at any time before there is a change in the intensity of the reflected light due to browning of the foodstuff.

During the toasting operation, the surface of the foodstuff will darken due to the heating thereof by the heating elements, thereby reducing the intensity of the light reflected from its illuminated surface. From the desired degree of browning of the foodstuff, the microprocessor 270 determines a target intensity, $I_T$, for the reflected light. For example, for lightly toasted bread the target intensity $I_T$ may be around 90% of the normalised intensity $I_N$, whereas for darker toasting the target intensity $I_T$ may be around 75% of the normalised intensity $I_N$. The microprocessor 270 preferably stores a look-up table for a range of different values for the target intensity $I_T$ each corresponding to a different degree of browning which may be set by the user. Alternatively, the microprocessor 270 may calculate the target intensity $I_T$ from the normalised intensity $I_N$ and the desired degree of browning. Once the signal output from the optical receiver 266 indicates that the target intensity $I_T$ has been reached, the toasting operation is terminated. Consequently, the duration of the toasting operation is independent of the initial temperature of the toasting chamber 36, allowing an even degree of toasting to be achieved for multiple successive toasting operations.

For safety purposes, the microprocessor 270 is preferably arranged to terminate the toasting process after a set period of time to avoid excessive drying of the foodstuff in the event that the target intensity is not reached before the expiry of this fixed period of time, for example is the foodstuff is heavily frozen white bread which does not brown quickly. This period of time may be varied depending on the selected degree of browning. For example, the period of time may be relatively long, for example around 4 minutes, for dark toasted bread, but shorter for lighter toasted bread, for example around 3 minutes. In any event, this period of time is selected to be longer than the time which it should take for intensity of the light reflected from the foodstuff to decrease to the target intensity $I_T$ for a variety of different foodstuffs.

In the event that the foodstuff to be toasted is relatively dark, for example if the foodstuff to be toasted is rye bread, a German black bread or bread which has been previously toasted bread, or if the illuminated portion of the foodstuff is relatively dark, for example a current of a hot cross bun, the illumination of the foodstuff by the green LED may be insufficient to raise the intensity of the reflected light to the set value, even when the intensity of the illumination of the foodstuff by the green LED is at a maximum value. In this case, the microprocessor 270 is arranged to control the duration of the cooking process on a time basis. Otherwise, there is a risk that the foodstuff may begin to burn before the target intensity $I_T$ has been reached. The microprocessor 270 may be arranged to set the duration of the cooking process depending on the intensity of the reflected light when the intensity of the illumination of the foodstuff by the green LED is at a maximum value. Alternatively, the duration of the cooking process may be a set value, for example around 140 seconds.

As discussed above, the heating elements 60, 62, 64 comprise a mica former on to which a nichrome heater wire is wound. When hot, the heater wires glow red. However, when the heater wires are relatively cold at the start of a toasting operation, there is an initial period of time, for example between 10 and 30 seconds depending on the voltage of the power supply, during which the heater wires do not glow. To compensate for the resulting change in the illumination of the foodstuff as the heater wires heat up and begin to glow, the microprocessor 270 is arranged to vary the intensity of the light emitted from the red LED 268 during the toasting operation. During a first period of the toasting operation, in which the heater wires do not glow, the intensity of the light emitted from the red LED 268 is maintained at a relatively high first value. During a second period of the toasting operation during which the heater wires begin to glow, the intensity of the light emitted from the red LED 268 is reduced gradually or stepwise by the microprocessor 270. As a result, the illumination of the optical receiver 266 by a combination of light which has (i) been emitted from the hot heater wires and reflected by the foodstuff towards the optical receiver 266 and (ii) been emitted the red LED 268 directly to the optical receiver 266, can be thus maintained at a relatively constant value during the toasting operation. During a third period of the toasting operation, during which the intensity of the light emitted from the hot heater wires is relatively constant, the intensity of the light emitted from the red LED 268 is maintained at a relatively low second value, which may be equal to or greater than zero.

When a toasting operation in the toasting chamber 36 is terminated, the microprocessor 270 de-activates those heating elements 60, 62, 64 which had been activated during the toasting operation. The microprocessor 270 energises the drive door motor 104 to rotate the gear assembly 106 to cause the drive arms 98, 100 to return the door to its open position illustrated in FIG. 5, thereby withdrawing the toasted foodstuff from the toasting chamber 36. The movement of the drive arms 98, 100 raises the guide plate 130, which re-engages the rings 152 of the lever arms 150 and is urged upwardly. The rings 152 are forced outwardly towards the side walls 82, 84 by the upward movement of the guide plate, causing the lever arms 150 to rotate to move the moveable heating elements 62, 64 away from the stationary heating element 60. With the movement of the moveable heating elements 62, 64 away from the stationary heating element 60, the torsion springs of the carriages 52, 54 urge the carriages towards their expanded forms, releasing the toasted foodstuff to easy removal by the user. The location of the air outlet region 30 in the upper surface 16 of the toaster 10 permits hot air to be released from the toasting chamber 36 to the environment at a location away from the hand of the user as the toasted foodstuff is removed from the carriages 52, 54. In conventional, vertical-loading toasters, the opening employed for loading and removing the bread is also the outlet for hot air generated in the toasting chamber. Thus, the user's hands are exposed to hot air when he attempts to remove toast from the toaster carriage, which can lead to discomfort. By separating the outlet for hot air from the toasting chamber 36 from the opening employed by the user to remove cooked food, this nuisance is avoided.

Further variations may be made without departing from the scope of the invention. For example, more toasting chambers may be provided for simultaneous toasting of four or more slices of bread. The invention has been described with reference to a domestic toaster, but is suitable for inclusion in commercial toasting appliances utilised in the catering or hotel trade, as well as toaster-oven and toaster-microwave combination appliances.

The invention claimed is:
1. A toasting appliance, comprising:
a toasting chamber,
a heating element for heating a foodstuff located within the toasting chamber,
an optical system for illuminating optically the foodstuff and for detecting light reflected from the foodstuff, and a controller for varying the illumination of the foodstuff by the optical system before the foodstuff begins to change colour due to heating thereof so that the intensity of the light reflected from the foodstuff is at or around a preset value, and for terminating the toasting operation when the intensity of the light reflected from the foodstuff has reduced from the preset value to a value depending on a desired degree of toasting of the foodstuff.

2. The toasting appliance of claim 1, wherein the controller is configured to vary the illumination of the foodstuff by the optical system so that the intensity of the light reflected from the foodstuff is at or around a preset value within fifty seconds of the toasting operation.

3. The toasting appliance of claim 1, wherein the controller is configured to vary the illumination of the foodstuff by the optical system so that the intensity of the light reflected from the foodstuff is at or around a preset value within thirty seconds of the toasting operation.

4. The toasting appliance of claim 1, wherein the controller is configured to terminate the toasting operation on a time basis in the event that the optical system is unable to raise the intensity of the light reflected from the foodstuff to the preset value.

5. The toasting appliance of claim 4, wherein the controller is configured to vary the duration of the toasting operation depending on the desired degree of toasting of the foodstuff when the toasting operation is terminated on a time basis.

6. The toasting appliance of claim 1, wherein the controller is configured to store for each degree of toasting selectable by a user a respective value for the intensity of light reflected from the foodstuff at which the toasting operation is to be terminated.

7. The toasting appliance of claim 1, wherein the optical system comprises a light source for illuminating the foodstuff and an optical receiver for receiving light reflected from the foodstuff.

8. The toasting appliance of claim 7, wherein the light source comprises an LED.

9. The toasting appliance of claim 7, wherein the light source is configured to emit light having a wavelength in the range from 400 to 700 nm.

10. A method of toasting a foodstuff, comprising the steps of:
locating the foodstuff within a toasting chamber;
illuminating optically by an optical system the foodstuff and detecting by the optical system light reflected from the foodstuff;
activating a heating element to commence a toasting operation including heating the foodstuff located within the toasting chamber;
before the foodstuff begins to change colour due to heating thereof, varying by a controller the illumination of the foodstuff by the optical system so that the intensity of the light reflected from the foodstuff is at or around a preset value; and
subsequently terminating by the controller the toasting operation when the intensity of the light reflected from the foodstuff has reduced from the preset value to a value depending on a desired degree of toasting of the foodstuff.

11. The method of claim 10, wherein the toasting operation is terminated on a time basis in the event that the intensity of the light reflected from the foodstuff can not be varied to the preset value.

12. The method of claim 11, wherein, when the toasting operation is terminated on a time basis, the duration of the toasting operation is varied depending on the desired degree of toasting of the foodstuff.

13. The method of claim 10, wherein the illumination of the foodstuff is varied so that the intensity of the light reflected from the foodstuff is at or around a preset value within fifty seconds from the activation of the heating element.

14. The method of claim 10, wherein the illumination of the foodstuff is varied so that the intensity of the light reflected from the foodstuff is at or around a preset value within thirty seconds from the activation of the heating element.

15. The toasting appliance of claim 7, wherein the light source is configured to emit light having a wavelength in the range from 450 to 600 nm.

* * * * *